(12) United States Patent
Gokan

(10) Patent No.: US 8,773,051 B2
(45) Date of Patent: Jul. 8, 2014

(54) POWER CONVERTER

(75) Inventor: Hiroshi Gokan, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 468 days.

(21) Appl. No.: 12/971,554

(22) Filed: Dec. 17, 2010

(65) Prior Publication Data

US 2011/0317461 A1 Dec. 29, 2011

(30) Foreign Application Priority Data

Jun. 28, 2010 (JP) ................................ 2010-146449

(51) Int. Cl.
*H02P 23/12* (2006.01)
(52) U.S. Cl.
USPC .................................................... 318/400.14
(58) Field of Classification Search
USPC ................. 363/127, 134, 111, 114; 290/40 C
See application file for complete search history.

(56) References Cited

U.S. PATENT DOCUMENTS

| | | | |
|---|---|---|---|
| 7,508,087 B2 | 3/2009 | Tsujimoto et al. | |
| 7,746,042 B2 * | 6/2010 | Williams et al. | 323/223 |
| 8,159,179 B2 | 4/2012 | Suzuki et al. | |
| 2002/0141209 A1 * | 10/2002 | Bridge | 363/89 |
| 2008/0225565 A1 * | 9/2008 | Tsujimoto et al. | 363/127 |
| 2008/0291711 A1 * | 11/2008 | Williams | 363/131 |
| 2009/0160408 A1 | 6/2009 | Suzuki et al. | |
| 2010/0008118 A1 | 1/2010 | Becker et al. | |
| 2010/0246228 A1 * | 9/2010 | Kazlauskas | 363/127 |
| 2011/0101898 A1 * | 5/2011 | Shinomoto et al. | 318/400.3 |
| 2011/0235381 A1 | 9/2011 | Wolf et al. | |
| 2011/0317461 A1 * | 12/2011 | Gokan | 363/134 |

FOREIGN PATENT DOCUMENTS

| | | |
|---|---|---|
| EP | 2043239 A1 | 4/2009 |
| JP | 57-017005 A | 1/1982 |
| JP | 11-356050 | 12/1999 |
| JP | 2002-218797 A | 8/2002 |
| JP | 2008-228450 A | 9/2008 |
| JP | 2008228450 A | 9/2008 |
| JP | 2010-110176 | 5/2010 |
| WO | 2007/114272 A1 | 10/2007 |
| WO | 2010034793 A1 | 4/2010 |

OTHER PUBLICATIONS

Office Action (Decision of a Patent Grant) dated Jul. 31, 2012, issued in corresponding Japanese Patent Application No. 2010-146449, and an English Translation thereof. (4 pages).
Extended European Search Report dated Dec. 21, 2012, issued in corresponding European Patent Appln. No. 10197277.6 (9 pages).
Office Action from Chinese Patent Office dated Jul. 3, 2013, issued in corresponding Chinese Patent Application No. 201110007142.7, with English translation thereof. (8 pages).

* cited by examiner

*Primary Examiner* — Shawki S Ismail
*Assistant Examiner* — Zoheb Imtiaz
(74) *Attorney, Agent, or Firm* — Buchanan Ingersoll & Rooney PC

(57) ABSTRACT

A synchronization detection PLL section generates an ON synchronized signal formed as a result of synchronization control based on a diode ON synthesized signal. The synchronization detection PLL section also generates an OFF synchronized signal formed as a result of synchronization control based on a diode OFF synthesized signal. A stator gate instruction generator PWM section generates a gate instruction signal for controlling the switching of a switching element on the basis of the ON synchronized signal and the OFF synchronized signal.

17 Claims, 10 Drawing Sheets

POWER CONVERTER

BACKGROUND OF THE INVENTION

1. Field of the Invention

The invention relates to a power converter, and in particular, to a vehicle power converter for use in a vehicle rotary motor mounted on a vehicle such as a car.

2. Description of the Related Art

Full-wave rectification using a diode applied as a rectifying element is a generally known system used in a vehicle rotary motor. Meanwhile, a recent rectifying system uses a switching element as a rectifying element to enhance efficiency, and reduces loss generated by the rectifying element.

In a vehicle power converter already suggested, for example, in Patent Document 1, a switching element is used as a rectifying element. In this power converter, ON and OFF of the switching element are controlled on the basis of the rotational position of a rotor of a vehicle rotary motor determined by rotational position detecting means.

In a system suggested, for example, in Patent Document 2, a position signal indicative of the rotational position and the angle of a rotary motor is compared with ON and OFF signals of a diode of each phase in each of higher and lower arms. This determines a time when the diode of this phase is turned on in a next cycle. A switching element of the same phase is turned on at the determined time to predict a time when the diode is turned off. Then, the switching element of the same phase is turned off at a time before the predicted time when the diode is turned off.

Patent Document 1: Japanese Patent Application Laid-Open No. 2002-218797

Patent Document 2: Japanese Patent Application Laid-Open No. 2008-228450

However, the system for determining the rotational position of a rotor of a vehicle rotary motor by using rotational position detecting means to make phase control in the ON-OFF operation of a switching element cannot respond to the need to change a time when the switching element is turned on or off in real time in response to load variations.

In order to determine the rotational position of a rotor of a vehicle rotary motor, a rotational position sensor or an angle sensor typified by a resolver should be attached to the shaft of the rotary motor, or, an RD converter for converting the output of a sensor to data of a rotational position or an angle should be prepared.

External noise may be superimposed on a position signal depending on the degree of accuracy in attaching a rotational position sensor such as a resolver, as a result of enhanced efficiency in synchronous rectification in fast-speed rotation caused by the response characteristic delay of an RD converter, or depending on the response characteristic of an RD converter in a noise region. As a result, chattering may be caused when a switching element is turned on, or, a switching element may be turned on in a period during which the switching element should be off, leading to variations in load torque of a rotary motor.

Turning a switching element on in a period during which the switching element should be off may result in the following. A current flows in a direction opposite to its original direction at the time of generation of electricity, or a short circuit is generated depending on a time when the switching element is turned on, or a period during which the switching element is on. These will cause large variations or drop in output voltage of a power source.

The following way is regarded as a simple process if attention is focused only on one phase. In this system, a position signal indicative of the rotational position and the angle of a rotary motor is compared with ON and OFF signals of a diode of each phase in each of higher and lower arms. This determines a time when the diode of this phase is turned on in a next cycle. A switching element of the same phase is turned on at the determined time to predict a time when the diode is turned off. Then, the switching element of the same phase is turned off at a time before the predicted time when the diode is turned off. However, an actual situation of this way is that a check should be made to see whether ON and OFF of a diode are detected in correct order in six phases including three phases in each of higher and lower arms.

This check requires the following determinations for each cycle: a determination as to whether the ON and OFF cycles of diodes of the six phases are substantially the same; a determination as to whether turning-on of a diode is detected precisely in U, V, and W phases in this order, in such a way that a phase difference is about 120 degrees in terms of electrical angle; a determination as to whether detection of turning-on of diodes is shifted 180 degrees in terms of electrical angle between higher and lower arms of the same phase; and a determination as to whether a period of time during which a switching element is on is substantially the same in the six phases. This check places a heavy burden on the process.

SUMMARY OF THE INVENTION

It is an object of the present invention to at least partially solve the problems in the conventional technology.

According to an aspect of the present invention, a power converter includes 2N (N is an integer no less than two) switching elements of N phases provided in each of higher and lower arms, 2N freewheeling diodes connected in parallel with corresponding ones of the 2N switching elements, a diode conducting state detector for determining times when the 2N freewheeling diodes are turned on and off, an ON PLL circuit for generating an ON synchronized signal formed as a result of synchronization control based on the times determined by the diode conducting state detector when the 2N freewheeling diodes are turned on, an OFF PLL circuit for generating an OFF synchronized signal formed as a result of synchronization control based on the times determined by the diode conducting state detector when the 2N freewheeling diodes are turned off, and a gate instruction generator PWM section for generating a gate instruction signal, which controls switching of the switching elements, on the basis of the ON synchronized signal and the OFF synchronized signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of a power converter according to the invention are described below in detail on the basis of the drawings. The embodiments are not intended to limit the scope of the invention.

First Embodiment

Figure 1:
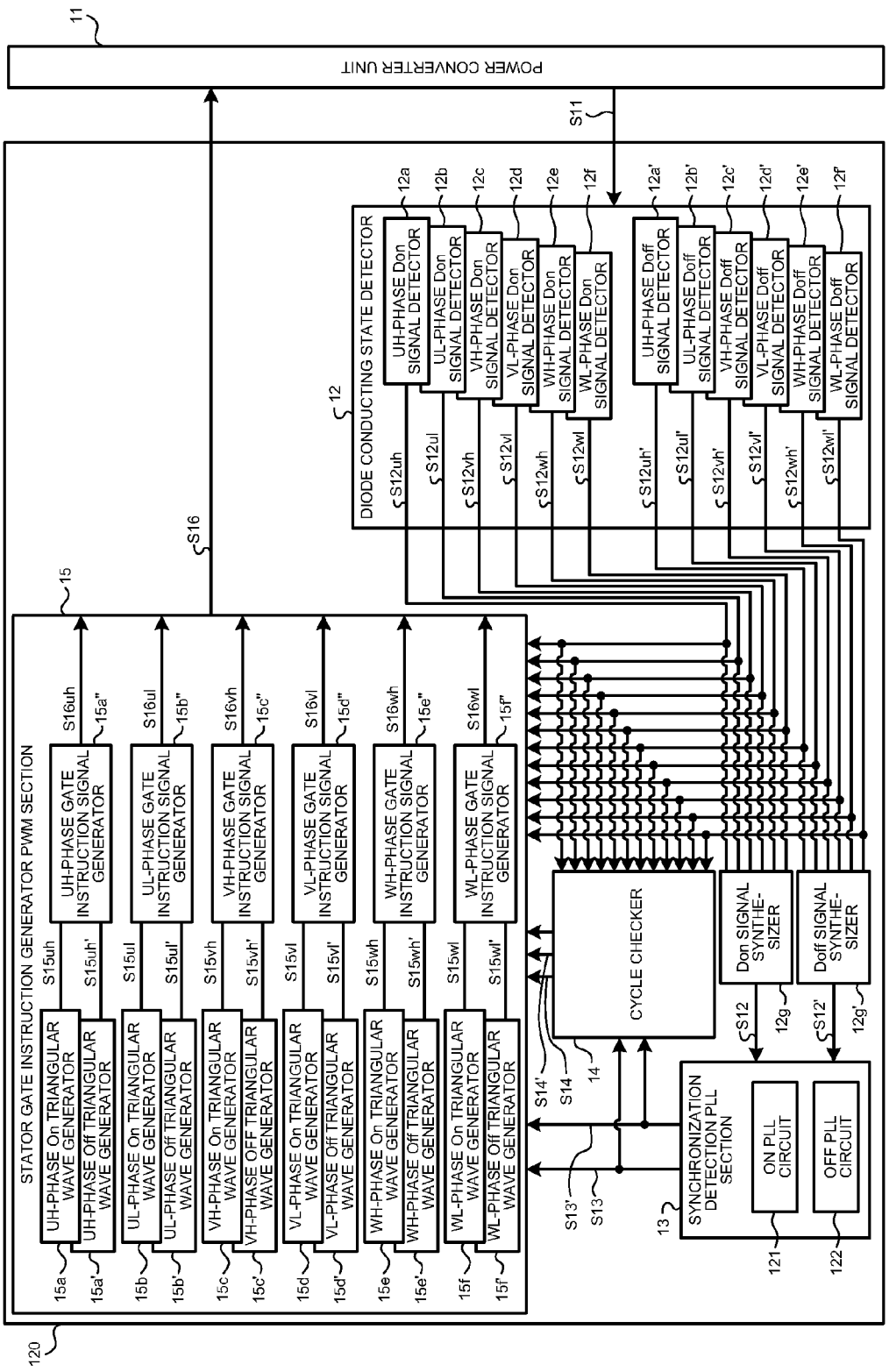
FIG. 1 is a block diagram showing the schematic configuration of a power converter of a first embodiment of the invention.
Figure 2:
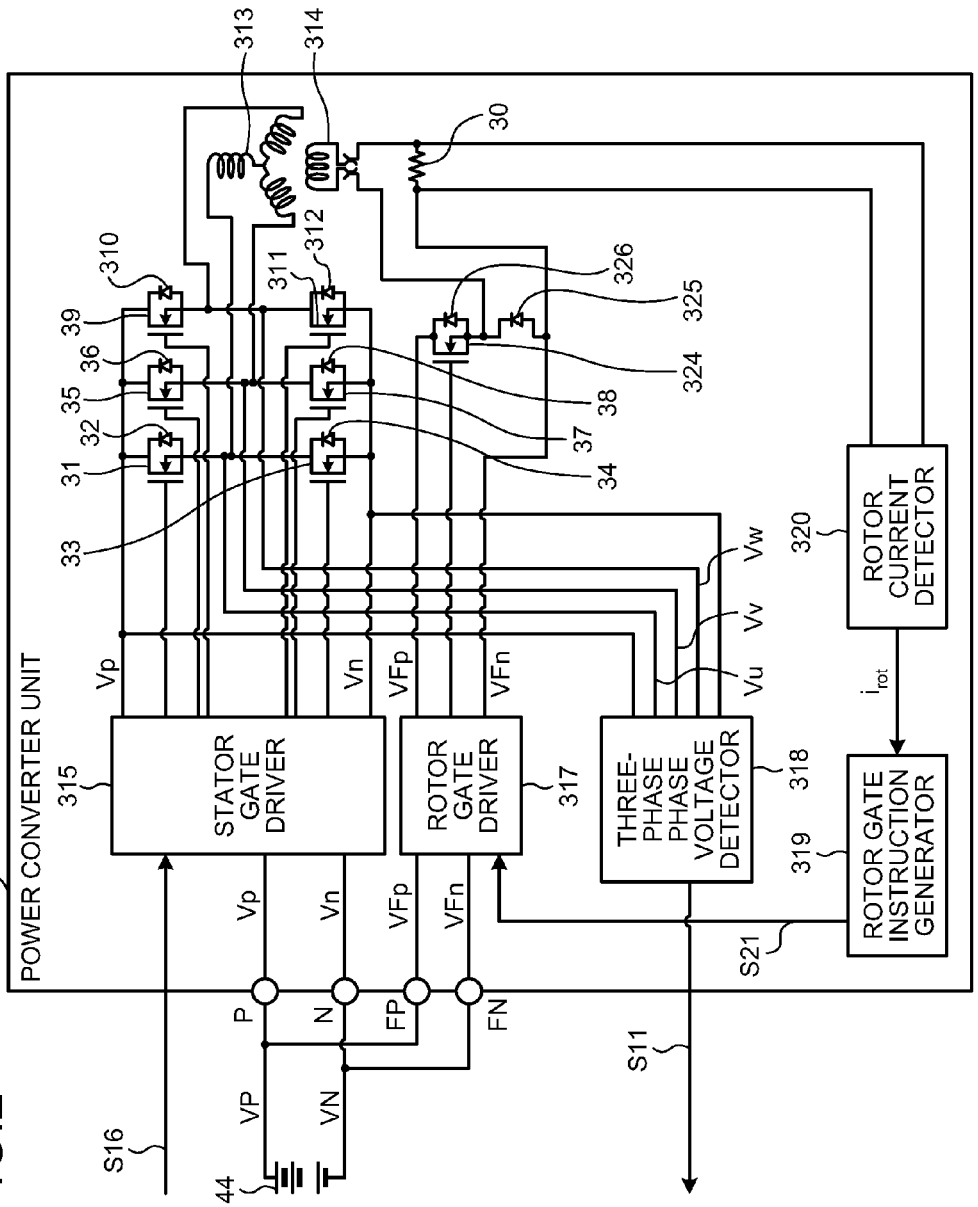
FIG. 2 is a block diagram showing an example of the schematic configuration of a power converter unit shown in FIG. 1.

FIG. 1 is a block diagram showing the schematic configuration of a power converter of a first embodiment of the invention. FIG. 2 is a block diagram showing an example of the schematic configuration of a power converter unit shown in FIG. 1. In the description below, a U-phase higher arm is called a UH phase, a U-phase lower arm is called a UL phase, a V-phase higher arm is called a VH phase, a V-phase lower arm is called a VL phase, a W-phase higher arm is called a WH phase, and a W-phase lower arm is called a WL phase. The higher and lower arms of each of the three phases including the U, V, and W phases are distinguished from each other, so that six obtained by multiplying two by three is the total number of phases.

With reference to FIG. 1, the power converter includes a power converter unit 11 and a gate control unit 120. The power converter unit 11 performs power conversion on the basis of a stator gate instruction signal S16 generated by the gate control unit 120. The gate control unit 120 generates the stator gate instruction signal S16 on the basis of a voltage detection signal S11 given from the power converter unit 11.

As shown in FIG. 2, the power converter unit 11 includes a three-phase armature winding 313 placed on a stator, and a field winding 314 placed on a rotor that form a rotary motor.

The power converter unit 11 includes positive terminals P and FP, and negative terminals N and FN. The positive terminals P and FP are connected to the positive pole of a storage battery 44, and the negative terminals N and FN are connected to the negative pole of the storage battery 44. The storage battery 44 may be replaced by a capacitor. A DC load voltage may be applied as a positive voltage VP of the storage battery 44. A ground voltage may be applied as a negative voltage VN of the storage battery 44.

The stator has a U-phase higher-arm switching element (hereinafter called UH element) 31, a U-phase lower-arm switching element (hereinafter called UL element) 33, a V-phase higher-arm switching element (hereinafter called VH element) 35, a V-phase lower-arm switching element (hereinafter called VL element) 37, a W-phase higher-arm switching element (hereinafter called WH element) 39, and a W-phase lower-arm switching element (hereinafter called WL element) 311.

IGBTs, bipolar transistors, or field-effect transistors may be used as the UH element 31, the UL element 33, the VH element 35, the VL element 37, the WH element 39, and the WL element 311.

A U-phase higher-arm freewheeling diode (hereinafter called UH diode) 32 is connected in parallel with the UH element 31. A U-phase lower-arm freewheeling diode (hereinafter called UL diode) 34 is connected in parallel with the UL element 33. A V-phase higher-arm freewheeling diode (hereinafter called VH diode) 36 is connected in parallel with the VH element 35. A V-phase lower-arm freewheeling diode (hereinafter called VL diode) 38 is connected in parallel with the UL element 37. A W-phase higher-arm freewheeling diode (hereinafter called WH diode) 310 is connected in parallel with the WH element 39. A W-phase lower-arm freewheeling diode (hereinafter called WL diode) 312 is connected in parallel with the WL element 311.

The UH element 31, the UL element 33, the VH element 35, the VL element 37, the WH element 39, and the WL element 311 form a three-phase bridge circuit. A connection point between the UH element 31 and the UL element 33 is connected to the U-phase terminal of the armature winding 313. A connection point between the VH element 35 and the VL element 37 is connected to the V-phase terminal of the armature winding 313. A connection point between the WH element 39 and the WL element 311 is connected to the W-phase terminal of the armature winding 313. By doing so, the evenly spaced UH element 31, UL element 33, VH element 35, VL element 37, WH element 39, and WL element 311 are connected in a circle to the motor.

A connection point among the UH element 31, the VH element 35, and the WH element 39 is connected through a stator gate driver 315 to the positive terminal P. A connection point among the UL element 33, the VL element 37, and the WL element 311 is connected through the stator gate driver 315 to the negative terminal N.

The stator has the stator gate driver 315 and a three-phase phase voltage detector 318. The stator gate driver 315 drives the gates of the UH element 31, the UL element 33, the VH element 35, the VL element 37, the WH element 39, and the WL element 311 on the basis of the stator gate instruction signal S16, thereby switching the UH element 31, the UL element 33, the VH element 35, the VL element 37, the WH element 39, and the WL element 311 on and off.

The three-phase phase voltage detector 318 detects a positive terminal voltage Vp to be applied to the connection point among the UH element 31, the VH element 35, and the WH element 39, and a negative terminal voltage Vn to be applied to the connection point among the UL element 33, the VL element 37, and the WL element 311. The three-phase phase voltage detector 318 also detects a U-phase induction voltage Vu generated at the connection point between the UH element 31 and the UL element 33, a V-phase induction voltage Vv generated at the connection point between the VH element 35 and the VL element 37, and a W-phase induction voltage Vw generated at the connection point between the WH element 39 and the WL element 311. Then, the three-phase phase voltage detector 318 can output the resultant voltages as the voltage detection signal S11.

The rotor has a field switching element 324 responsible for PWM (pulse width modulation) control of a field current. A freewheeling diode 326 is connected in parallel with the field switching element 324. An IGBT, a bipolar transistor, or a field-effect transistor may be used as the field switching element 324.

A diode 325 is connected between electric wires as a pair connected to opposite ends of the field switching element 324. The field switching element 324 is placed in one of the electric wires, and a resistor 30 is placed in the other of the electric wires.

The rotor has a rotor gate driver 317, a rotor gate instruction generator 319, and a rotor current detector 320. The rotor current detector 320 can output a detected value $i_{rot}$ of a rotor current on the basis of a voltage across the resistor 30. The rotor gate instruction generator 319 can generate a rotor gate instruction signal S21 on the basis of the detected value $i_{rot}$ of a rotor current. The rotor gate driver 317 can drive the gate of the field switching element 324 on the basis of the rotor gate instruction signal S21, thereby turning the field switching element 324 on and off.

FIG. 2 shows the three-phase field winding power generator motor including the three-phase armature winding 313 placed on the stator, and the field winding 314 placed on the rotor. However, a different number of phases and a different field system are applicable. As an example, a permanent magnet system is applicable. Furthermore, the power generator motor is not necessarily part of an integrated structure in which the motor is integrated with the power converter unit 11. The power generator motor may be formed as a separate unit. More specifically, the three-phase armature winding 313 and the field winding 314 placed on the rotor in the power converter unit 11 may be physically separated from the other constituent elements.

As shown in FIG. 1, the gate control unit 120 includes a diode conducting state detector 12, a synchronization detection PLL section 13, a cycle checker 14, a stator gate instruction generator PWM section 15, a diode ON signal synthesizer (hereinafter called Don signal synthesizer) 12g, and a diode OFF signal synthesizer (hereinafter called Doff signal synthesizer) 12g'.

The diode conducting state detector 12 can determine times when each of the six diodes shown in FIG. 2 including the UH diode 32, the UL diode 34, the VH diode 36, the VH diode 38, the WH diode 310, and the WL diode 312 is turned on and off.

The diode conducting state detector 12 may include a U-phase higher-arm diode ON signal detector (hereinafter called UH-phase Don signal detector) 12a, a U-phase lower-arm diode ON signal detector (hereinafter called UL-phase Don signal detector) 12b, a V-phase higher-arm diode ON signal detector (hereinafter called VH-phase Don signal detector) 12c, a V-phase lower-arm diode ON signal detector (hereinafter called VL-phase Don signal detector) 12d, a W-phase higher-arm diode ON signal detector (hereinafter called WH-phase Don signal detector) 12e, and a W-phase lower-arm diode ON signal detector (hereinafter called WL-phase Don signal detector) 12f. The diode conducting state detector 12 may also include a U-phase higher-arm diode OFF signal detector (hereinafter called UH-phase Doff signal detector) 12a', a U-phase lower-arm diode OFF signal detector (hereinafter called UL-phase Doff signal detector) 12b', a V-phase higher-arm diode OFF signal detector (hereinafter called VH-phase Doff signal detector) 12c', a V-phase lower-arm diode OFF signal detector (hereinafter called VL-phase Doff signal detector) 12d', a W-phase higher-arm diode OFF signal detector (hereinafter called WH-phase Doff signal detector) 12e', and a W-phase lower-arm diode OFF signal detector (hereinafter called WL-phase Doff signal detector) 12f'.

The UH-phase Don signal detector 12a can output a U-phase higher-arm diode ON detection signal (hereinafter called UH-phase Don detection signal) S12uh on the basis of a time when the UH diode 32 is turned on.

The UL-phase Don signal detector 12b can output a U-phase lower-arm diode ON detection signal (hereinafter called UL-phase Don detection signal) S12ul on the basis of a time when the UL diode 34 is turned on.

The VH-phase Don signal detector 12c can output a V-phase higher-arm diode ON detection signal (hereinafter called VH-phase Don detection signal) S12vh on the basis of a time when the VH diode 36 is turned on.

The VL-phase Don signal detector 12d can output a V-phase lower-arm diode ON detection signal (hereinafter called VL-phase Don detection signal) S12vl on the basis of a time when the VL diode 38 is turned on.

The WH-phase Don signal detector 12e can output a W-phase higher-arm diode ON detection signal (hereinafter called WH-phase Don detection signal) S12wh on the basis of a time when the WH diode 310 is turned on.

The WL-phase Don signal detector 12f can output a W-phase lower-arm diode ON detection signal (hereinafter called WL-phase Don detection signal) S12wl on the basis of a time when the WL diode 312 is turned on.

The UH-phase Doff signal detector 12a' can output a U-phase higher-arm diode OFF detection signal (hereinafter called UH-phase Doff detection signal) S12uh' on the basis of a time when the UH diode 32 is turned off.

The UL-phase Doff signal detector 12b' can output a U-phase lower-arm diode OFF detection signal (hereinafter called UL-phase Doff detection signal) S12ul' on the basis of a time when the UL diode 34 is turned off.

The VH-phase Doff signal detector 12c' can output a V-phase higher-arm diode OFF detection signal (hereinafter called VH-phase Doff detection signal) S12vh' on the basis of a time when the VH diode 36 is turned off.

The VL-phase Doff signal detector 12d' can output a V-phase lower-arm diode OFF detection signal (hereinafter called VL-phase Doff detection signal) S12vl' on the basis of a time when the VL diode 38 is turned off.

The WH-phase Doff signal detector 12e' can output a W-phase higher-arm diode OFF detection signal (hereinafter called WH-phase Doff detection signal) S12wh' on the basis of a time when the WH diode 310 is turned off.

The WL-phase Doff signal detector 12f' can output a W-phase lower-arm diode OFF detection signal (hereinafter called WL-phase Doff detection signal) S12wl' on the basis of a time when the WL diode 312 is turned off.

As an example, synchronous counters may be used as the UH-phase Don signal detector 12a, the UL-phase Don signal detector 12b, the VH-phase Don signal detector 12c, the VL-phase Don signal detector 12d, the WH-phase Don signal detector 12e, the WL-phase Don signal detector 12f, the UH-phase Doff signal detector 12a', the UL-phase Doff signal detector 12b', the VH-phase Doff signal detector 12c', the VL-phase Doff signal detector 12d', the WH-phase Doff signal detector 12e', and the WL-phase Doff signal detector 12f'.

Synchronous counters continue to detect ON or OFF of diodes in a predetermined period of time, so that a check can be made to see whether diodes are on or off. As a result, false detection caused by mixing of noises can be reduced.

The Don signal synthesizer 12g synthesizes the UH-phase Don detection signal S12uh, the UL-phase Don detection signal S12ul, the VH-phase Don detection signal S12vh, the VL-phase Don detection signal S12vl, the WH-phase Don detection signal S12wh, and the WL-phase Don detection signal S12*wl* in the same temporal sequence. As a result, a diode ON synthesized signal S12 can be generated.

The Doff signal synthesizer 12*g'* synthesizes the UH-phase Doff detection signal S12*uh'*, the UL-phase Doff detection signal S12*ul'*, the VH-phase Doff detection signal S12*vh'*, the VL-phase Doff detection signal S12*vl'*, the WH-phase Doff detection signal S12*wh'*, and the WL-phase Doff detection signal S12*wl'* in the same temporal sequence, thereby generating a diode OFF synthesized signal S12'.

As an example, six-input OR circuits may be used as the Don signal synthesizer 12*g* and the Doff signal synthesizer 12*g'*. Or, the Don signal synthesizer 12*g* may be formed by providing commonality of the outputs of the UH-phase Don signal detector 12*a*, the UL-phase Don signal detector 12*b*, the VH-phase Don signal detector 12*c*, the VL-phase Don signal detector 12*d*, the WH-phase Don signal detector 12*e*, and the WL-phase Don signal detector 12*f* via a buffer. Further, the Doff signal synthesizer 12*g'* may formed by providing commonality of the outputs of the UH-phase Doff signal detector 12*a'*, the UL-phase Doff signal detector 12*b'*, the VH-phase Doff signal detector 12*c'*, the VL-phase Doff signal detector 12*d'*, the WH-phase Doff signal detector 12*e'*, and the WL-phase Doff signal detector 12*f'* via a buffer.

The synchronization detection PLL section 13 can generate an ON synchronized signal S13 formed as a result of synchronization control based on the diode ON synthesized signal S12. The synchronization detection PLL section 13 can also generate an OFF synchronized signal S13' formed as a result of synchronization control based on the diode OFF synthesized signal S12'.

The ON synchronized signal S13 and the OFF synchronized signal S13' can be generated separately. More specifically, the synchronization detection PLL section 13 may include an ON PLL circuit 121 and an OFF PLL circuit 122. The ON PLL circuit 121 can generate the ON synchronized signal S13 formed as a result of synchronization control based on the diode ON synthesized signal S12. The OFF PLL circuit 122 can generate the OFF synchronized signal S13' formed as a result of synchronization control based on the diode OFF synthesized signal S12'.

Figure 3:
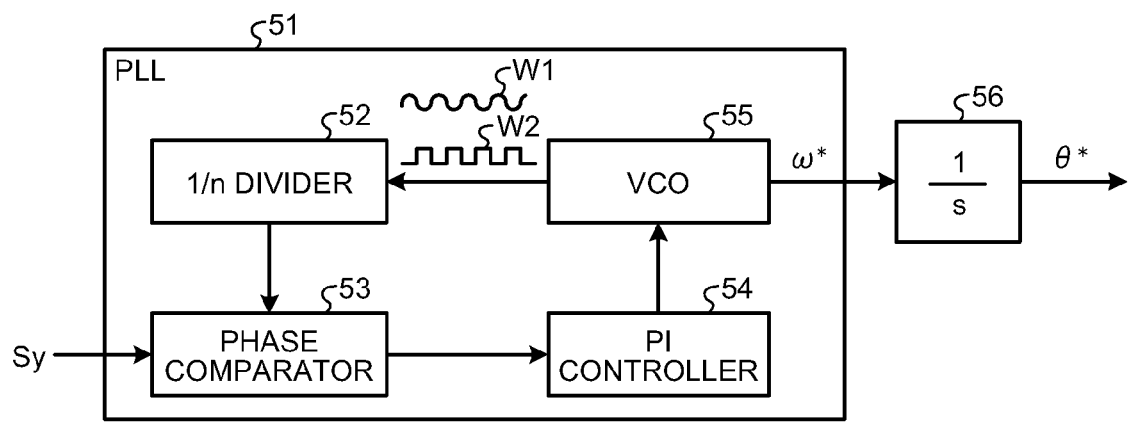
FIG. 3 is a block diagram showing an example of a phase-locked loop circuit used in the power converter shown in FIG. 1.

FIG. 3 is a block diagram showing an example of a phase-locked loop circuit used in the power converter shown in FIG. 1. A phase-locked loop circuit 51 shown in FIG. 3 includes a 1/n divider 52, a phase comparator 53, a PI controller 54, and a voltage control oscillator 55. The PI controller 54 may be replaced by a low-pass filter.

An oscillation signal $\omega_{\_}$ generated by the voltage control oscillator 55 is divided by n (n is a positive integer) by the 1/n divider 52, and is then applied to the phase comparator 53. The oscillation signal $\omega_{\_}$ may have a sinusoidal wave W1 or a square wave W2. The oscillation signal $\omega_{\_}$ is compared in phase with a periodic signal Sy applied from outside in the phase comparator 53, and a result of comparison is given through the PI controller 54 to the voltage control oscillator 55. As a result, the frequency of the oscillation signal $\omega_{\_}$ is controlled such that the oscillation signal $\omega_{\_}$ coincides in phase with the periodic signal Sy. Next, the oscillation signal $\omega_{\_}$ is integrated by an integrator 56, thereby generating a triangular wave signal $\theta_{\_}$. Assuming that the frequency of the oscillation signal $\omega_{\_}$ is f, the oscillation signal $\omega_{\_}$ is converted to an angular velocity by following the formula $\omega_{\_}=2\pi f$. A resultant angular velocity is integrated by the integrator 56, thereby obtaining an estimated output of angular position.

If the phase-locked loop circuit 51 and the integrator 56 are used as the ON PLL circuit 121 shown in FIG. 1, the triangular wave signal $\theta_{\_}$ can be given as the ON synchronized signal S13 by using the diode ON synthesized signal S12 as the periodic signal Sy.

If the phase-locked loop circuit 51 and the integrator 56 are used as the OFF PLL circuit 122 shown in FIG. 1, the triangular wave signal $\theta_{\_}$ can be given as the OFF synchronized signal S13' by using the diode OFF synthesized signal S12' as the periodic signal Sy.

With reference to FIG. 1, the cycle checker 14 compares the UH-phase Don detection signal S12*uh*, the UL-phase Don detection signal S12*ul*, the VH-phase Don detection signal S12*vh*, the VL-phase Don detection signal S12*vl*, the WH-phase Don detection signal S12*wh*, and the WL-phase Don detection signal S12*wl* with the ON synchronized signal S13. The cycle checker 14 also compares the UH-phase Doff detection signal S12*uh'*, the UL-phase Doff detection signal S12*ul'*, the VH-phase Doff detection signal S12*vh'*, the VL-phase Doff detection signal S12*vl'*, the WH-phase Doff detection signal S12*wh'*, and the WL-phase Doff detection signal S12*wl'* with the OFF synchronized signal S13'. As a result, the cycle checker 14 is allowed to see whether the U-phase induction voltage Vu, the V-phase induction voltage Vv, and the W-phase induction voltage Vw have correct cycles in all the phases, and are detected in correct order in all the phases.

Based on the ON synchronized signal S13 and the OFF synchronized signal S13', the stator gate instruction generator PWM section 15 can generate the stator gate instruction signal S16 for controlling the switching of the UH element 31, the UL element 33, the VH element 35, the VL element 37, the WH element 39, and the WL element 311.

The stator gate instruction generator PWM section 15 may include a U-phase higher-arm ON triangular wave generator 15*a*, a U-phase higher-arm OFF triangular wave generator 15*a'*, a U-phase higher-arm gate instruction signal generator 15*a"*, a U-phase lower-arm ON triangular wave generator 15*b*, a U-phase lower-arm OFF triangular wave generator 15*b'*, and a U-phase lower-arm gate instruction signal generator 15*b"*. The stator gate instruction generator PWM section 15 may also include a V-phase higher-arm ON triangular wave generator 15*c*, a V-phase higher-arm OFF triangular wave generator 15*c'*, a V-phase higher-arm gate instruction signal generator 15*c"*, a V-phase lower-arm ON triangular wave generator 15*d*, a V-phase lower-arm OFF triangular wave generator 15*d'*, and a V-phase lower-arm gate instruction signal generator 15*d"*. The stator gate instruction generator PWM section 15 may also include a W-phase higher-arm ON triangular wave generator 15*e*, a W-phase higher-arm OFF triangular wave generator 15*e'*, a W-phase higher-arm gate instruction signal generator 15*e"*, a W-phase lower-arm ON triangular wave generator 15*f*, a W-phase lower-arm OFF triangular wave generator 15*f'*, and a W-phase lower-arm gate instruction signal generator 15*f"*.

The U-phase higher-arm ON triangular wave generator 15*a* can generate a U-phase higher-arm ON triangular wave (hereinafter called UH-phase ON triangular wave) S15*uh* on the basis of the ON synchronized signal S13 applied in an interval between a time when the UH diode 32 is turned on last time and a time when the UH diode 32 is turned on this time that are indicated by the UH-phase Don detection signal S12*uh*.

The U-phase higher-arm OFF triangular wave generator 15*a'* can generate a U-phase higher-arm OFF triangular wave (hereinafter called UH-phase OFF triangular wave) S15*uh'* on the basis of the OFF synchronized signal S13' applied in an interval between a time when the UH diode 32 is turned off last time and a time when the UH diode 32 is turned off this time that are indicated by the UH-phase Doff detection signal S12$uh'$.

The U-phase higher-arm gate instruction signal generator 15$a''$ can generate a gate instruction signal S16$uh$ of the UH element 31 on the basis of a result of comparison between the UH-phase ON triangular wave S15$uh$ and the UH-phase OFF triangular wave S15$uh'$.

The U-phase lower-arm ON triangular wave generator 15$b$ can generate a U-phase lower-arm ON triangular wave (hereinafter called UL-phase ON triangular wave) S15$ul$ on the basis of the ON synchronized signal S13 applied in an interval between a time when the UH diode 34 is turned on last time and a time when the UL diode 34 is turned on this time that are indicated by the UL-phase Don detection signal S12$ul$.

The U-phase lower-arm OFF triangular wave generator 15$b'$ can generate a U-phase lower-arm OFF triangular wave (hereinafter called UL-phase OFF triangular wave) S15$ul'$ on the basis of the OFF synchronized signal S13' applied in an interval between a time when the UL diode 34 is turned off last time and a time when the UL diode 34 is turned off this time that are indicated by the UL-phase Doff detection signal S12$ul'$.

The U-phase lower-arm gate instruction signal generator 15$b''$ can generate a gate instruction signal S16$ul$ of the UL element 33 on the basis of a result of comparison between the UL-phase ON triangular wave S15$ul$ and the UL-phase OFF triangular wave S15$ul'$.

The V-phase higher-arm ON triangular wave generator 15$c$ can generate a V-phase higher-arm ON triangular wave (hereinafter called VH-phase ON triangular wave) S15$vh$ on the basis of the ON synchronized signal S13 applied in an interval between a time when the VH diode 36 is turned on last time and a time when the VH diode 36 is turned on this time that are indicated by the VH-phase Don detection signal S12$vh$.

The V-phase higher-arm OFF triangular wave generator 15$c'$ can generate a V-phase higher-arm OFF triangular wave (hereinafter called VH-phase OFF triangular wave) S15$vh'$ on the basis of the OFF synchronized signal S13' applied in an interval between a time when the VH diode 36 is turned off last time and a time when the VH diode 36 is turned off this time that are indicated by the VH-phase Doff detection signal S12$vh'$.

The V-phase higher-arm gate instruction signal generator 15$c''$ can generate a gate instruction signal S16$vh$ of the VH element 36 on the basis of a result of comparison between the VH-phase ON triangular wave S15$vh$ and the VH-phase OFF triangular wave S15$vh'$.

The V-phase lower-arm ON triangular wave generator 15$d$ can generate a V-phase lower-arm ON triangular wave (hereinafter called VL-phase ON triangular wave) S15$vl$ on the basis of the ON synchronized signal S13 applied in an interval between a time when the VL diode 38 is turned on last time and a time when the VL diode 38 is turned on this time that are indicated by the VL-phase Don detection signal S12$vl$.

The V-phase lower-arm OFF triangular wave generator 15$d'$ can generate a V-phase lower-arm OFF triangular wave (hereinafter called VL-phase OFF triangular wave) S15$vl'$ on the basis of the OFF synchronized signal S13' applied in an interval between a time when the VL diode 38 is turned off last time and a time when the VL diode 38 is turned off this time that are indicated by the VL-phase Doff detection signal S12$vl'$.

The V-phase lower-arm gate instruction signal generator 15$d''$ can generate a gate instruction signal S16$vl$ of the VL element 37 on the basis of a result of comparison between the VL-phase ON triangular wave S15$vl$ and the VL-phase OFF triangular wave S15$vl'$.

The W-phase higher-arm ON triangular wave generator 15$e$ can generate a W-phase higher-arm ON triangular wave (hereinafter called WH-phase ON triangular wave) S15$wh$ on the basis of the ON synchronized signal S13 applied in an interval between a time when the WH diode 310 is turned on last time and a time when the WH diode 310 is turned on this time that are indicated by the WH-phase Don detection signal S12$wh$.

The W-phase higher-arm OFF triangular wave generator 15$e'$ can generate a W-phase higher-arm OFF triangular wave (hereinafter called WH-phase OFF triangular wave) S15$wh'$ on the basis of the OFF synchronized signal S13' applied in an interval between a time when the WH diode 310 is turned off last time and a time when the WH diode 310 is turned off this time that are indicated by the WH-phase Doff detection signal S12$wh'$.

The W-phase higher-arm gate instruction signal generator 15$e''$ can generate a gate instruction signal S16$wh$ of the WH element 39 on the basis of a result of comparison between the WH-phase ON triangular wave S15$wh$ and the WH-phase OFF triangular wave S15$wh'$.

The W-phase lower-arm ON triangular wave generator 15$f$ can generate a W-phase lower-arm ON triangular wave (hereinafter called WL-phase ON triangular wave) S15$wl$ on the basis of the ON synchronized signal S13 applied in an interval between a time when the WL diode 312 is turned on last time and a time when the WL diode 312 is turned on this time that are indicated by the WL-phase Don detection signal S12$wl$.

The W-phase lower-arm OFF triangular wave generator 15$f'$ can generate a W-phase lower-arm OFF triangular wave (hereinafter called WL-phase OFF triangular wave) S15$wl'$ on the basis of the OFF synchronized signal S13' applied in an interval between a time when the WL diode 312 is turned off last time and a time when the WL diode 312 is turned off this time that are indicated by the WL-phase Doff detection signal S12$wl'$.

The W-phase lower-arm gate instruction signal generator 15$f''$ can generate a gate instruction signal S16$wl$ of the WL element 311 on the basis of a result of comparison between the WL-phase ON triangular wave S15$wl$ and the WL-phase OFF triangular wave S15$wl'$.

Figure 4:
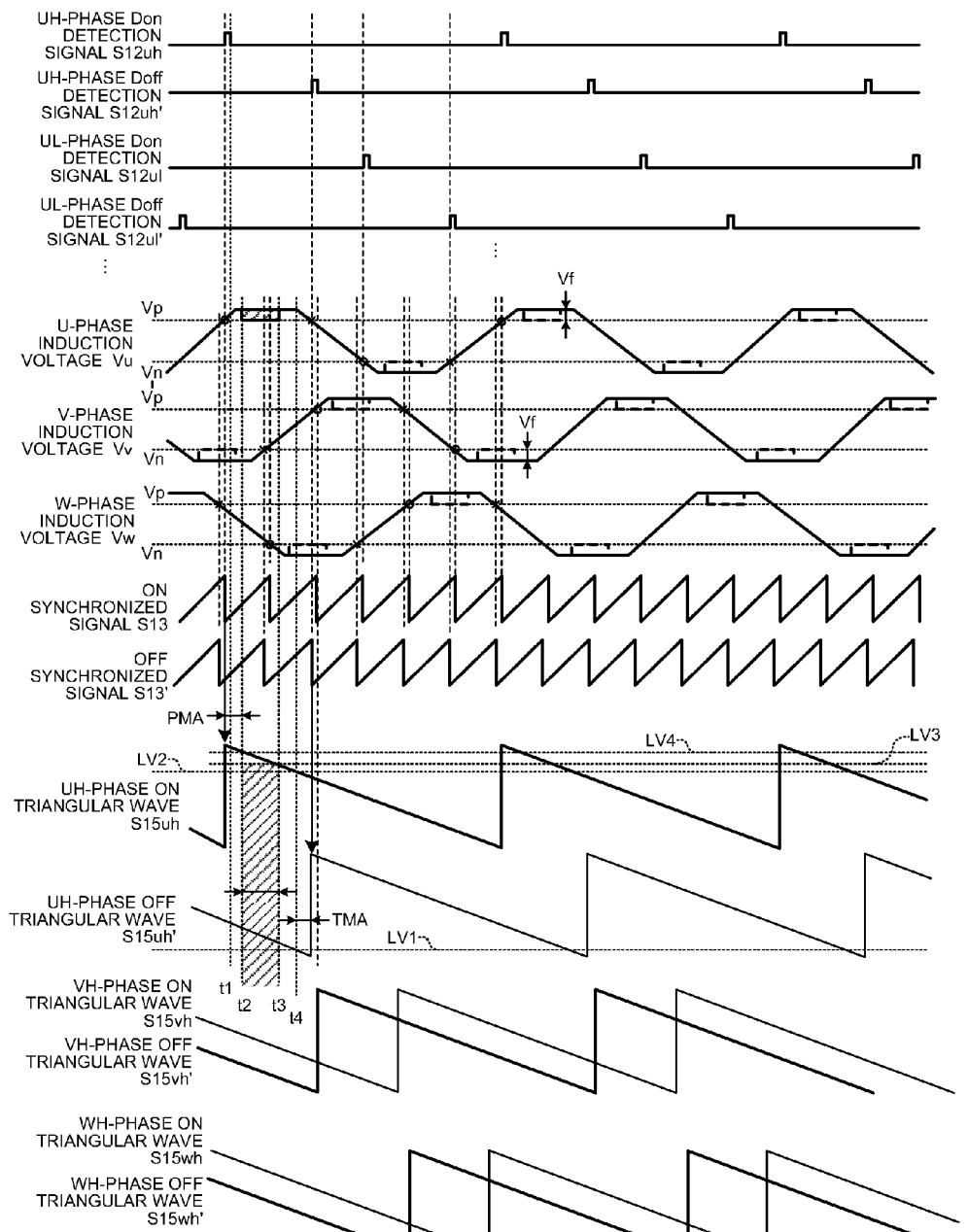
FIG. 4 is a timing chart showing a signal waveform of each part of the power converter shown in FIG. 1.

FIG. 4 is a timing chart showing a signal waveform of each part of the power converter shown in FIG. 1. The example of FIG. 4 shows the waveforms of the UH-phase Don detection signal S12$uh$, the UL-phase Don detection signal S12$ul$, the UH-phase Doff detection signal S12$uh'$, and the UL-phase Doff detection signal S12$ul'$. The example of FIG. 4 does not show the waveforms of the VH-phase Don detection signal S12$vh$, the VL-phase Don detection signal S12$vl$, the WH-phase Don detection signal S12$wh$, the WL-phase Don detection signal S12$wl$, the VH-phase Doff detection signal S12$vh'$, the VL-phase Doff detection signal S12$vl'$, the WH-phase Doff detection signal S12$wh'$, and the WL-phase Doff detection signal S12$wl'$.

The example of FIG. 4 shows the waveforms of the UH-phase ON triangular wave S15$uh$, the UH-phase OFF triangular wave S15$uh'$, the VH-phase ON triangular wave S15$vh$, the VH-phase OFF triangular wave S15$vh'$, the WH-phase ON triangular wave S15$wh$, and the WH-phase OFF triangular wave S15$wh'$. The example of FIG. 4 does not show the waveforms of the UL-phase ON triangular wave S15$ul$, the UL-phase OFF triangular wave S15$ul'$, the VL-phase ON triangular wave S15$vl$, the VL-phase OFF triangular wave S15vl′, the WL-phase ON triangular wave S15wl, and the WL-phase OFF triangular wave S15wl′.

In FIG. 4, the stator gate driver 315 drives the gates of the UH element 31, the UL element 33, the VH element 35, the VL element 37, the WH element 39, and the WL element 311 shown in FIG. 2, thereby converting a direct current defined by the positive terminal voltage Vp and the negative terminal voltage Vn to a three-phase alternating current. This three-phase alternating current is applied to the U-phase terminal, the V-phase terminal, and the W-phase terminal of the armature winding 313.

The rotor gate driver 317 drives the gate of the field switching element 324 shown in FIG. 2, thereby converting a direct current defined by a positive terminal voltage VFp and a negative terminal voltage VFn to an alternating current. This alternating current is applied across the field winding 314. A rotor current flowing in the field winding 314 is converted to a voltage at the resistor 30, and the voltage across the resistor 30 is given to the rotor current detector 320. Then, the detected value $i_{rot}$ of the rotor current is given to the rotor gate instruction generator 319.

The rotor gate instruction generator 319 generates the rotor gate instruction signal S21 on the basis of the detected value $i_{rot}$ of the rotor current. The generated rotor gate instruction signal S21 is given to the rotor gate driver 317, thereby driving the gate of the field switching element 324.

The three-phase phase voltage detector 318 detects the positive terminal voltage Vp, the negative terminal voltage Vn, the U-phase induction voltage Vu, the V-phase induction voltage Vv, and the W-phase induction voltage Vw, and applies a result of detection as the voltage detection signal S11 to the diode conducting state detector 12 shown in FIG. 1.

The diode conducting state detector 12 determines that a diode is ON in the following situation. A forward current flows into each of the UH diode 32, the UL diode 34, the VH diode 36, the VH diode 38, the WH diode 310, and the WL diode 312, so a forward voltage Vf is applied across the corresponding diode.

The diode conducting state detector 12 determines that a diode is OFF in the following situation. A forward current does not flow into each of the UH diode 32, the UL diode 34, the VH diode 36, the VL diode 38, the WH diode 310, and the WL diode 312, so that the forward voltage Vf is not generated as a result of an open circuit formed between the opposite ends of the diode.

When a current flows in the UH diode 32, the U-phase induction voltage Vu decreases in amplitude in a negative direction by the forward voltage Vf from the negative terminal voltage Vn. When a current flows in the UL diode 34, the U-phase induction voltage Vu increases in amplitude in a positive direction by the forward voltage Vf from the positive terminal voltage Vp. With attention focused on the U-phase induction voltage Vu, if the switching devices (UH and UL elements) 31 and 33 are turned on as a result of synchronous rectification, the U-phase induction voltage Vu drops by the forward voltage Vf in a period during which the UH and UL elements 31 and 33 are on. In this case, the amplitude of the U-phase induction voltage Vu is determined by the positive terminal voltage Vp and the negative terminal voltage Vn. If the UH and UL elements 31 and 33 are turned off, the amplitude of the U-phase induction voltage Vu is again determined by the positive terminal voltage Vp, Vp+Vf, and voltage Vn−Vf.

By way of example, the diode conducting state detector 12 can determine times when the UH diode 32, the VH diode 36, and the WH diode 310 are turned on on the basis of the following formulas (1) to (3) respectively:

$$\text{ON state of } UH \text{ diode 32: } VP \leq Vu \leq VP + Vf \quad (1)$$

$$\text{ON state of } VH \text{ diode 34: } VP \leq Vv \leq VP + Vf \quad (2)$$

$$\text{ON state of } WH \text{ diode 310: } VP \leq Vw \leq VP + Vf \quad (3)$$

The diode conducting state detector 12 can determine times when the UH diode 32, the VH diode 36, and the WH diode 310 are turned off on the basis of the following formulas (4) to (6) respectively:

$$\text{OFF state of } UH \text{ diode 32: } Vu < Vp \quad (4)$$

$$\text{OFF state of } VH \text{ diode 34: } Vv < Vp \quad (5)$$

$$\text{OFF state of } WH \text{ diode 310: } Vw < Vp \quad (6)$$

The diode conducting state detector 12 can determine times when the UL diode 34, the VL diode 38, and the WL diode 312 are turned on on the basis of the following formulas (7) to (9) respectively:

$$\text{ON state of } UL \text{ diode 34: } -Vf \leq Vu \leq 0 \quad (7)$$

$$\text{ON state of } VL \text{ diode 38: } -Vf \leq Vv \leq 0 \quad (8)$$

$$\text{ON state of } WL \text{ diode 312: } -Vf \leq Vw \leq 0 \quad (9)$$

The diode conducting state detector 12 can determine times when the UL diode 34, the VL diode 38, and the WL diode 312 are turned off on the basis of the following formulas (10) to (12) respectively:

$$\text{OFF state of } UL \text{ diode 34: } 0 < Vu \quad (10)$$

$$\text{OFF state of } VL \text{ diode 38: } 0 < Vv \quad (11)$$

$$\text{OFF state of } WL \text{ diode 312: } 0 < Vw \quad (12)$$

If the U-phase induction voltage Vu, the V-phase induction voltage Vv, and the W-phase induction voltage Vw are shifted in phase by 120 degrees, the UH diode 32 starts to conduct at a time when the U-phase induction voltage Vu satisfies the formula (1) defined with respect to the positive terminal voltage Vp. Then, the U-phase Don signal detector 12a determines that the UH diode 32 is on, and outputs the UH-phase Don detection signal S12uh to the Don signal synthesizer 12g.

The UH diode 32 stops conducting at a time when the U-phase induction voltage Vu satisfies the formula (4) defined with respect to the positive terminal voltage Vp. Then, the U-phase Doff signal detector 12a′ determines that the UH diode 32 is off, and outputs the UH-phase Doff detection signal S12uh′ to the Doff signal synthesizer 12g′.

Likewise, checks to see whether the UL diode 34, the VH diode 36, the VL diode 38, the WH diode 310, and the WL diode 312 are on or off are made by comparing the U-phase induction voltage Vu, the V-phase induction voltage Vv and the W-phase induction voltage Vw with the positive terminal voltage Vp and the negative terminal voltage Vn.

The diode conducting state detector 12 outputs the UH-phase Don detection signal S12uh, the UL-phase Don detection signal S12ul, the VH-phase Don detection signal S12vh, the VL-phase Don detection signal S12vl, the WH-phase Don detection signal S12wh, and the WL-phase Don detection signal S12wl to the Don signal synthesizer 12g, to the cycle checker 14, and to the stator gate instruction generator PWM section 15.

Next, the Don signal synthesizer 12g obtains a logical sum of the UH-phase Don detection signal S12uh, the UL-phase Don detection signal S12ul, the VH-phase Don detection signal S12vh, the VL-phase Don detection signal S12vl, the WH-phase Don detection signal S12wh, and the WL-phase Don detection signal S12wl, thereby generating the diode ON synthesized signal S12. The generated diode ON synthesized signal S12 is given to the ON PLL circuit 121.

The diode conducting state detector 12 outputs the UH-phase Doff detection signal S12uh', the UL-phase Doff detection signal S12ul', the VH-phase Doff detection signal S12vh', the VL-phase Doff detection signal S12vl', the WH-phase Doff detection signal S12wh', and the WL-phase Doff detection signal S12wl' to the Doff signal synthesizer 12g', to the cycle checker 14, and to the stator gate instruction generator PWM section 15.

Next, the Doff signal synthesizer 12g' obtains a logical sum of the UH-phase Doff detection signal S12uh', the UL-phase Doff detection signal S12ul', the VH-phase Doff detection signal S12vh', the VL-phase Doff detection signal S12vl', the WH-phase Doff detection signal S12wh', and the WL-phase Doff detection signal S12wl', thereby generating the diode OFF synthesized signal S12'. The generated diode OFF synthesized signal S12' is given to the OFF PLL circuit 122.

The ON PLL circuit 121 generates the ON synchronized signal S13 formed as a result of synchronization control based on the diode ON synthesized signal S12. The OFF PLL circuit 122 generates the OFF synchronized signal S13' formed as a result of synchronization control based on the diode OFF synthesized signal S12'.

The ON PLL circuit 121 is locked and the ON synchronized signal S13 is generated only when diodes of the six phases including the UH, UL, VH, VL, WH, and WL phases are sequentially turned on at substantially regular intervals. Accordingly, the synchronization control based on the diode ON synthesized signal S12 makes it possible to determine that no short circuit or no open circuit is generated between the six phases including the UH, UL, VH, VL, WH, and WL phases. The synchronization control based on the diode ON synthesized signal S12 also makes it possible to determine that the V and W phases are shifted +120 degrees and −120 degrees respectively from the U phase, or makes it possible to determine that the UL phase is shifted 180 degrees from the UH phase.

Likewise, the OFF PLL circuit 122 is locked and the OFF synchronized signal S13' is generated only when diodes of the six phases including the UH, UL, VH, VL, WH, and WL phases are sequentially turned off at substantially regular intervals. Accordingly, the synchronization control based on the diode OFF synthesized signal S12' makes it possible to determine that no short circuit or no open circuit is generated between the six phases including the UH, UL, VH, VL, WH, and WL phases. The synchronization control based on the diode OFF synthesized signal S12' also makes it possible to determine that the V and W phases are shifted +120 degrees and −120 degrees respectively from the U phase, or makes it possible to determine that the UL phase is shifted 180 degrees from the UH phase.

Diodes are turned on and off at times that are controlled separately from each other. Accordingly, even when intervals between times when diodes are turned on and times when the diodes are turned off are extended or shortened depending on the amount of electricity generated, the ON PLL circuit 121 and the OFF PLL circuit 122 can stably be locked. As a result, the ON synchronized signal S13 and the OFF synchronized signal S13' can be formed with stability.

Figure 5:
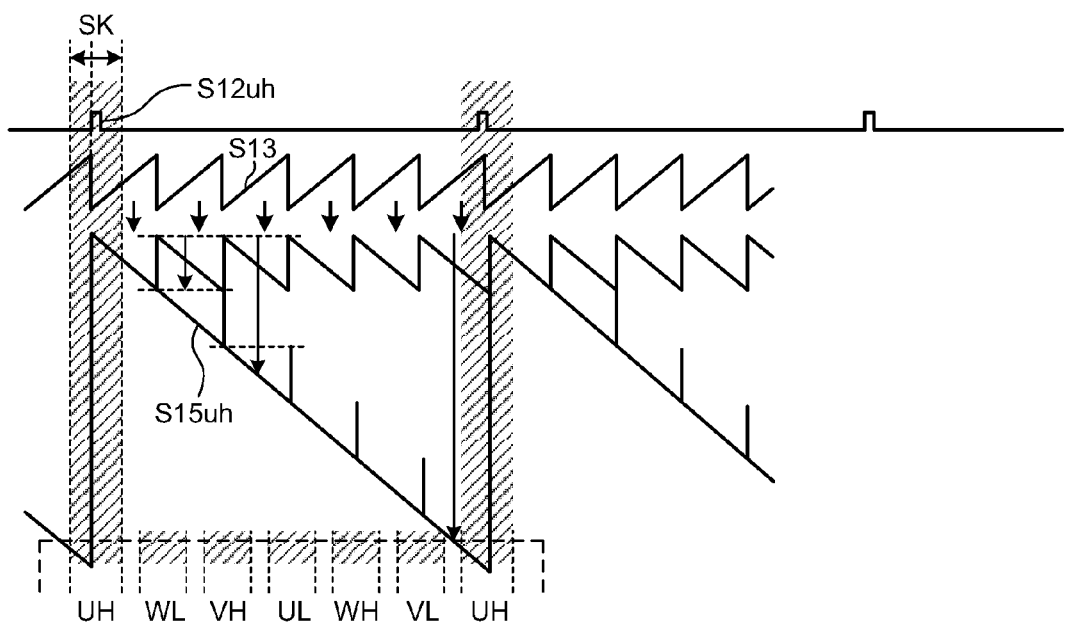
FIG. 5 is a timing chart showing a way performed by a cycle checker shown in FIG. 1 to check to see whether the cycle of each phase is correct, and whether detection is performed in correct order in all phases.

FIG. 5 is a timing chart showing a way performed by the cycle checker 14 shown in FIG. 1 to check to see whether the cycle of each phase is correct, and to check to see whether detection is performed in correct order in all the phases. In the example shown in FIG. 5, the cycle checker 14 provides a fixed synchronization determining interval SK extending backward and forward of the time axis of the ON synchronized signal S13. The synchronization determining interval SK is provided for each of the UH, UL, VH, VL, WH, and WL phases.

The synchronization determining intervals SK of all the phases including the UH, UL, VH, VL, WH, and WL phases are connected together. Next, a check is made to see whether the UH-phase Don detection signal S12uh, the UL-phase Don detection signal S12ul, the VH-phase Don detection signal S12vh, the VL-phase Don detection signal S12vl, the WH-phase Don detection signal S12wh, and the WL-phase Don detection signal S12wl fall within their respective synchronization determining intervals SK. As a result, it is determined whether a cycle of determining times when diodes are turned on is complied with. If it is determined that the cycle of determining times when diodes are turned on is complied with, the cycle checker 14 outputs a synchronization determining signal S14 to the stator gate instruction generator PWM section 15.

The cycle checker 14 can also check to see whether a cycle of determining times when diodes are turned off is complied with by following the same process as that for determining times when diodes are turned on. In order to determine a current phase, the cycle checker 14 can hold Curr_phase [i] (i=0, 1, 2, 3, 4, 5) and Last_phase [i] (i=0, 1, 2, 3, 4, 5).

Figure 6:
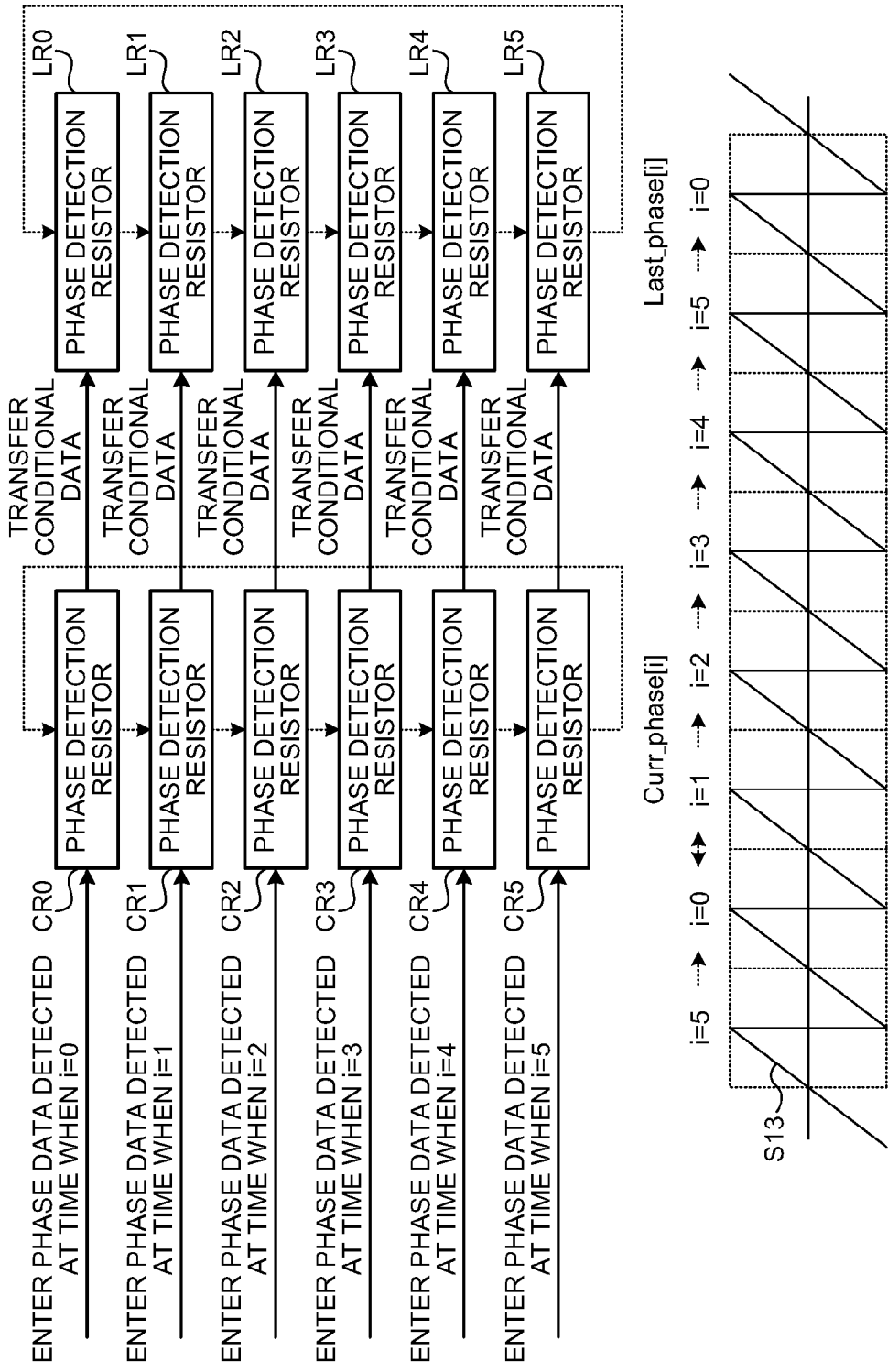
FIG. 6 is a block diagram showing the schematic configurations of phase detection resistors provided to determine a current phase.

FIG. 6 is a block diagram showing the schematic configurations of phase detection resistors provided to determine a current phase. With reference to FIG. 6, each time a cycle Y1 of the ON synchronized signal S13 is completed, an argument i in each of Curr_phase [i] and Last_phase [i] is incremented by one to become i+1. The argument i will be 0 after 5, so that Curr_phase [i] and Last_phase [i] each form an endless loop.

The cycle checker 14 includes phase detection resistors CR0 to CR5 in which phase data detected by Curr_phase [i] (i=0, 1, 2, 3, 4, 5) respectively are stored. The cycle checker 14 also includes phase detection resistors LR0 to LR5 in which conditional phase data transmitted from Last_phase [i] (i=0, 1, 2, 3, 4, 5) respectively are stored.

In the case of three phases, the prepared phase data may contain seven types of data including "null" indicating failure of phase detection, "UH" indicating that the UH phase is detected, "UL" indicating that the UL phase is detected, "VH" indicating that the VH phase is detected, "VL" indicating that the VL phase is detected, "WH" indicating that the WH phase is detected, and "WL" indicating that the WL phase is detected.

Figure 7:
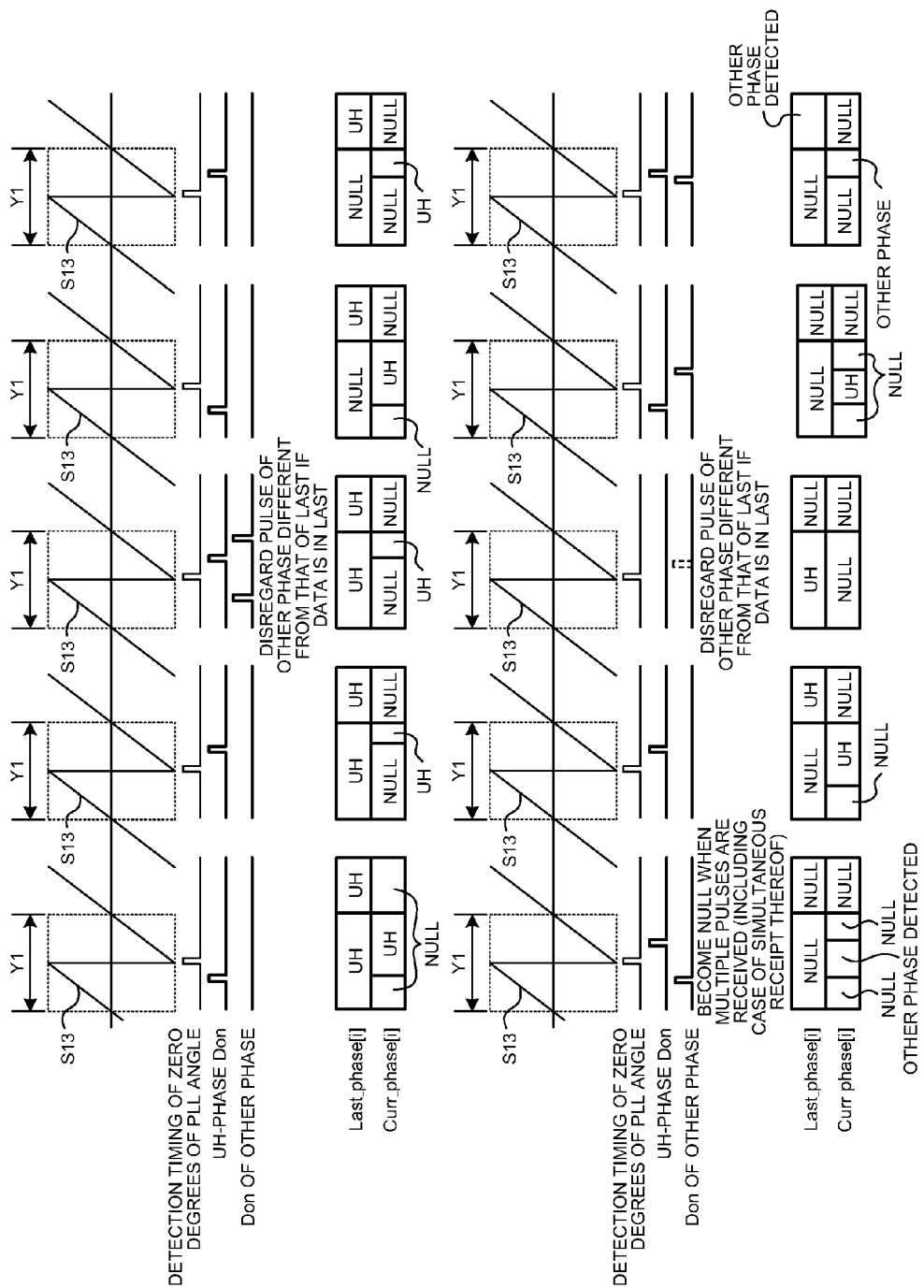
FIG. 7 shows a way of detecting current phases and last phases of the power converter shown in FIG. 1, and a way of updating phases according to circumstances.

FIG. 7 shows a way of detecting current phases and last phases of the power converter shown in FIG. 1, and a way of updating phases according to circumstances. While the UH phase will be explained as an example in FIG. 7, the ways shown therein are applied to the other phases including the UL, VH, VL, WL, and WL phases.

With reference to FIG. 7, a time when a diode is turned on is determined for each cycle Y1 of the ON synchronized signal S13. Information indicating that Curr_phase [i] is "UH" is written into Curr_phase [i] at a time when the diode of the UH phase is determined to be on. Each time the cycle Y1 of the ON synchronized signal S13 is completed, the information in Curr_phase [i] is basically transferred to Last_phase [i]. If the same phase is detected as a last phase and a current phase, the data of Last_phase [i] is updated. If different phases are detected as a last phase and a current phase, "null" is written into Last_phase [i]. Thus, it is determined that the same phase is continuously detected.

Last_phase [i] (i=0, 1, 2, 3, 4, 5) basically succeeds to information in Curr_phase [i]. As an example, if both Last_ phase [i] and Curr_phase [i] are "UH," Last_phase [i] becomes "UH" in a subsequent cycle Y1 of the ON synchronized signal S13.

As a practical matter, specific rules for determining the condition of next Last_phase [i] can be defined by using the conditions of Last_phase [i] and Curr_phase [i]. More specifically, Last_phase [i] can be determined under conditions to determine Last_phase [i] in the ten patterns shown in FIG. 7. Next, under condition that Last_phase [i] does not show a change in phase detection over a predetermined number of cycles, the cycle checker 14 can output the synchronization determining signal S14 indicating successful synchronization and phase detection.

In addition to the synchronization determining signal S14, the cycle checker 14 can also output the value of Last_phase [n] in a current cycle of the ON synchronized signal S13 as estimated phase information S14' to the stator gate instruction generator PWM section 15. Likewise, the cycle checker 14 can output the value of Last_phase [n] in a current cycle of the OFF synchronized signal S13' as estimated phase information S14' to the stator gate instruction generator PWM section 15.

In the exemplary simplified configuration shown in FIG. 1, with attention focused only on the UH phase, the U-phase higher-arm ON triangular wave generator 15*a* is activated at zero degrees of the ON synchronized signal S13 in a period of a last cycle in which the UH phase is detected. Then, based on a count value obtained after such an interval of time that the count value is reset at zero degrees of the ON synchronized signal S13 in a period of a current cycle in which the UH phase is detected, the higher-arm ON triangular wave generator 15*a* generates the UH-phase ON triangular wave S15*uh*.

In the exemplary simplified configuration, the U-phase higher-arm OFF triangular wave generator 15*a*' is activated at zero degrees of the OFF synchronized signal S13' in a period of a last cycle in which the UH phase is detected. Then, based on a count value obtained after such an interval of time that the count value is reset at zero degrees of the OFF synchronized signal S13' in a period of a current cycle in which the UH phase is detected, the higher-arm OFF triangular wave generator 15*a*' generates the UH-phase OFF triangular wave S15*uh*'.

Following the same process as that for generating the UH-phase ON triangular wave S15*uh* and UH-phase OFF triangular wave S15*uh*', the stator gate instruction generator PWM section 15 generates ON triangular waves and OFF triangular waves for the other phases including the UL, VH, VL, WL, and WL phases.

It is assumed that the UH-phase ON triangular wave S15*uh* and the UH-phase OFF triangular wave S15*uh*' have descending slopes as shown in FIG. 4. In this case, the U-phase higher-arm gate instruction signal generator 15*a*" can generate the gate instruction signal S16*uh* such that the UH element 31 is turned on in a period during which the UH-phase ON triangular wave S15*uh* is higher in level than the UH-phase OFF triangular wave S15*uh*'.

If the UH element 31 is turned on in the period during which the UH-phase ON triangular wave S15*uh* is higher in level than the UH-phase OFF triangular wave S15*uh*', a margin may be allowed for in a period during which the UH element 31 is on in order to avoid a problem such as reverse current flow in the UH element 31.

As an example, with attention focused only on the UH-phase ON triangular wave S15*uh*, a level LV4 to be compared with the UH-phase ON triangular wave S15*uh* may be provided. The level LV4 indicates a time in terms of electrical angle when the UH element 31 should be turned on after a point of zero degrees in each cycle of the ON synchronized signal S13.

With attention focused only on the UH-phase OFF triangular wave S15*uh*', a level LV1 to be compared with the UH-phase OFF triangular wave S15*uh*' may be provided. The level LV1 indicates a time in terms of electrical angle when the UH element 31 should be turned off before a point of 360 degrees in each cycle of the OFF synchronized signal S13'.

A level LV3 indicating the angle of a period during which the UH element 31 subjected to current synchronous rectification is on may also be provided. The level LV3 can determine the maximum possible degrees of an electrical angle the UH element 31 can be turned on in synchronous rectification, in a period in which the UH element 31 can be turned on after a fall time t1 of the UH-phase Don detection signal S12*uh*. As a result, the UH element 31 is turned on after the UH diode 32 is turned on in synchronous rectification.

A period after the UH-phase ON triangular wave S15*uh* reaches the level LV4, which is before the UH-phase OFF triangular wave S15*uh*' reaches the level LV1 after the UH diode 32 is turned on, and which is also before the UH-phase ON triangular wave S15*uh* reaches the level LV3, may be defined as a period during which the UH element 31 is on.

With reference to FIG. 1, the U-phase higher-arm gate instruction signal generator 15*a*" compares the level of the UH-phase ON triangular wave S15*uh* with the level LV3, thereby defining a period during which the UH element 31 is on.

Following the same process as that for generating the gate instruction signal S16*uh*, the stator gate instruction generator PWM section 15 generates the gate instruction signals S16*ul*, S16*vh*, S16*vl*, S16*wh*, and S16*wl* for the other phases including the UL, VH, VL, WL, and WL phases, respectively.

Thus, a detection member for detecting the rotational position and the angle of a rotary motor, and a converting member for sensing an output signal of the detection member and converting the signal to data, are not required to realize synchronous rectification. Furthermore, load torque of the rotary motor is stabilized independently of the degree of accuracy in attaching these members.

The ON PLL circuit 121 is synchronously controlled on the basis of the diode ON synthesized signal S12. This allows collective checks to see whether diodes of the six phases including the UH, UL, VH, VL, WH, and WL phases are turned on at correct intervals, and to see whether all the phases are detected in correct order. Furthermore, the OFF PLL circuit 122 is synchronously controlled on the basis of the diode OFF synthesized signal S12'. This allows collective checks to see whether diodes of the six phases including the UH, UL, VH, VL, WH, and WL phases are turned off at correct intervals, and to see whether all the phases are detected in correct order.

Accordingly, determinations including the following can be made on the basis of the operating conditions of the ON PLL circuit 121 and the OFF PLL circuit 122: a determination as to whether the ON and OFF cycles of diodes of the six phases including the UH, UL, VH, VL, WH, and WL phases are substantially the same; a determination as to whether turning-on of diodes is detected precisely in the U, V, and W phases in this order, in such a way that a phase difference is about 120 degrees in terms of electrical angle; a determination as to whether detection of turning-on of diodes is shifted 180 degrees in terms of electrical angle between higher and lower arms of the same phase; and a determination as to whether a period of time during which a switching element is on is substantially the same in the six phases. This eliminates the need to store the cycles of all the phases and the positions of detection of all the phases, and to make detailed comparisons of the degrees of the detected cycles and detected positions of detection between the phases. As a result, a burden to be placed on the process is reduced, and a storage area is also reduced.

The ON PLL circuit 121 and the OFF PLL circuit 122 may be designed in advance in consideration of their capabilities to respond to rotations including low-speed rotation at which synchronous rectification of a vehicle rotary motor is started, and highest speed rotation. This allows fine controls of variations in the gains of the ON PLL circuit 121 and the OFF PLL circuit 122 during actual operation. As a result, a data processing system can be constructed without using a high-speed microcomputer that is required to respond to simultaneous variations in load or the number of revolutions.

Second Embodiment

With reference to FIG. 5, the U-phase higher-arm ON triangular wave generator 15a shown in FIG. 1 may generate the UH-phase ON triangular wave S15uh in a way as follows. First, the U-phase higher-arm ON triangular wave generator 15a is activated at zero degrees of the ON synchronized signal S13 in a period of a last cycle in which the UH phase is detected. Next, without being reset in a detection of phases other than a self phase, the U-phase higher-arm ON triangular wave generator 15a reverses components of the ON synchronized signal S13 in a current cycle corresponding to the six phases including the UH, WL, VH, UL, WH, and VL phases, and then sequentially adds the components. The U-phase higher-arm ON triangular wave generator 15a is thereafter reset at zero degrees of the ON synchronized signal S13 in a period of a current cycle in which the UH phase is detected.

The U-phase higher-arm OFF triangular wave generator 15a' shown in FIG. 1 may generate the UH-phase OFF triangular wave S15uh' in a way as follows. First, the U-phase higher-arm OFF triangular wave generator 15a' is activated at zero degrees of the OFF synchronized signal S13' in a period of a last cycle in which the UH phase is detected. Next, without being reset in a detection of phases other than a self phase, the U-phase higher-arm OFF triangular wave generator 15a' reverses components of the OFF synchronized signal S13" in a current cycle corresponding to the six phases including the UH, WL, VH, UL, WH, and VL phases, and then sequentially adds the components. The U-phase higher-arm OFF triangular wave generator 15a' is thereafter reset at zero degrees of the OFF synchronized signal S13' in a period of a current cycle in which the UH phase is detected.

Following the same process as that for generating the UH-phase ON triangular wave S15uh and UH-phase OFF triangular wave S15uh', the stator gate instruction generator PWM section 15 can generate ON triangular waves and OFF triangular waves for the other phases including the UL, VH, VL, WL, and WL phases.

The ON triangular waves generated in the way of the second embodiment can be synchronized with the ON PLL circuit 121 at times when diodes of all the phases are turned on. Accordingly, compared to the ON triangular waves generated in the way of the first embodiment, the ON triangular waves generated in the way of the second embodiment more easily respond to the change in angular velocity of a rotary motor. Further, the OFF triangular waves generated in the way of the second embodiment can be synchronized with the OFF PLL circuit 122 at times when diodes of all the phases are turned off. Accordingly, compared to the OFF triangular waves generated in the way of the first embodiment, the OFF triangular waves generated in the way of the second embodiment more easily respond to the change in angular velocity of the rotary motor.

With attention focused only on the U-phase, for example, it is assumed, for example, that a time when the UH element 31 is turned off is estimated by comparing the level LV1 with a margin TMA expressed in electrical angle and defined to safely maintain the ON state of the UH element 31 immediately before the UH diode 32 is turned on. In this case, a time when the UH element 31 is turned off can be estimated more precisely, as the UH-phase OFF triangular wave 15uh' generated in the way of the second embodiment has greater responsiveness to speed than that generated in the way of the first embodiment.

As described above, with attention focused only on the ON side, the ON triangular waves are generated on the basis of a result of addition of the components of the ON synchronized signal S13 corresponding to the six phases including the UH, WL, VH, UL, WH, and VL phases. Thus, change in speed of the rotary motor is detected in a synchronization process of the ON PLL circuit 121, and the detected change can be incorporated directly into the UH-phase ON triangular wave S15uh.

The ON PLL circuit 121 is in synchronization with times when diodes of all the phases including a self phase and phases except the self phase are turned on. Accordingly, the UH-phase ON triangular wave S15uh more precisely responds to change in speed of rotation of the rotary motor in real time. Furthermore, the ON synchronized signal S13 after one cycle always equals the ON synchronized signal S13 at a terminal point. Accordingly, a terminal point of the UH-phase ON triangular wave S15uh can be formed by incorporating a self phase and all the phases except the self phase (if turning off of a diode is detected early, five phases including a phase immediately before the self phase).

Thus, when compared to a way of estimating a time when a diode is turned off on the basis of the UH-phase Doff detection signal S12uh', estimation of a time when the UH element 31 is turned off by comparing the level LV1 with the margin TMA enhances accuracy in estimating a time when the UH element 31 is turned off.

Third Embodiment

Figure 8:
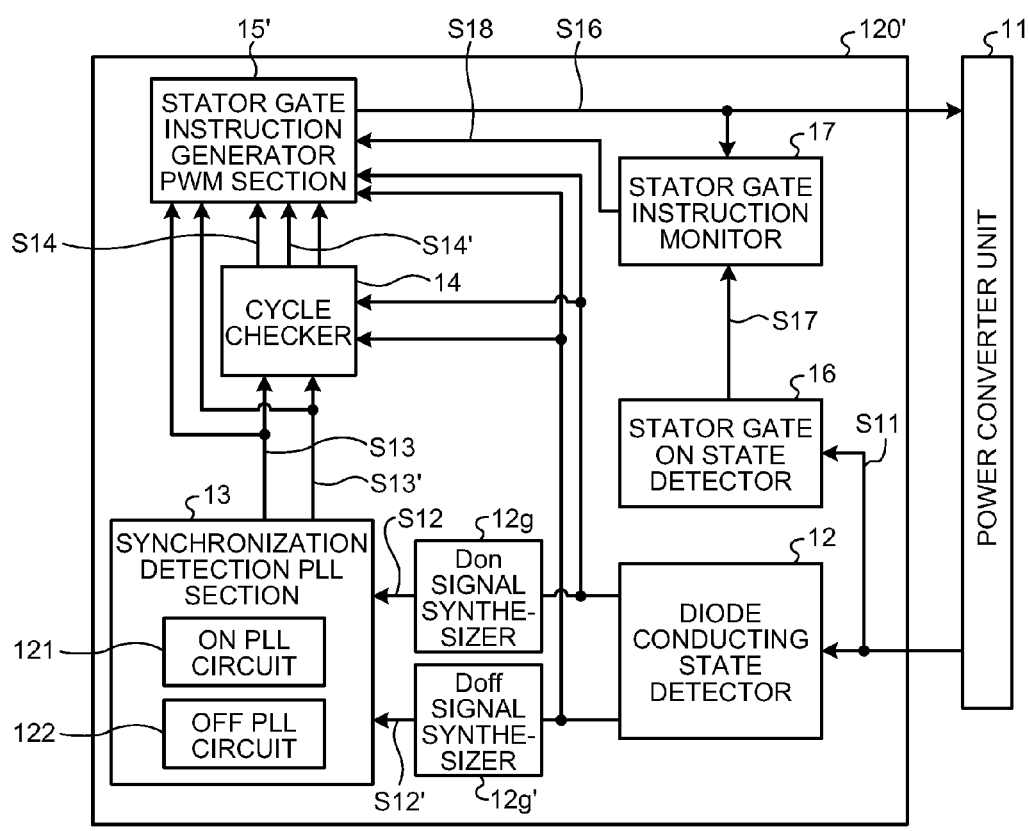
FIG. 8 is a block diagram showing the schematic configuration of a power converter of a third embodiment of the invention.

FIG. 8 is a block diagram showing the schematic configuration of a power converter of a third embodiment of the invention. In the power converter of FIG. 8, the gate control unit 120 of the power converter shown in FIG. 1 is replaced by a gate control unit 120'.

The gate control unit 120' includes a stator gate instruction generator PWM section 15' instead of the stator gate instruction generator PWM section 15 shown in FIG. 1. The gate control unit 120' further includes a stator gate ON state detector 16 and a stator gate instruction monitor 17.

The stator gate ON state detector 16 determines times when each of the UH element 31, the UL element 33, the VH element 35, the VL element 37, the WH element 39, and the WL element 311 is turned on and off on the basis of the voltage detection signal S11, and can output a switching element ON detection signal S17.

The stator gate instruction monitor 17 compares a time when each of the UH element 31, the UL element 33, the VH element 35, the VL element 37, the WH element 39, and the WL element 311 is turned on with the stator gate instruction signal S16 to monitor a synchronous rectification operation. Then, the stator gate instruction monitor 17 can output a diode ON detection period signal S18.

The stator gate instruction generator PWM section 15' can generate the stator gate instruction signal S16 on the basis of the ON synchronized signal S13, the OFF synchronized signal 13', and a result of monitoring by the stator gate instruction monitor 17.

The stator gate instruction monitor 17 checks to see whether each of the UH element 31, the UL element 33, the VH element 35, the VL element 37, the WH element 39, and the WL element 311 was turned off in compliance with estimation by the gate instruction generator PWM section 15'. The stator gate instruction monitor 17 also checks to see whether each of the UH diode 32, the UL diode 34, the VH diode 36, the VH diode 38, the WH diode 310, and the WL diode 312 was turned off in compliance with estimation by the gate instruction generator PWM section 15'.

Next, with attention focused only on the UH phase, the stator gate instruction monitor 17 makes a check in an interval between a time when the UH element 31 is turned off and a time when the UH diode 32 is turned off to see whether a period during which the UH diode 32 is on is detected after the UH diode 32 is turned off. If such a period is detected, the stator gate instruction monitor 17 can notify a length of time when the UH diode 32 is on to the stator gate instruction generation PWM section 15'.

The stator gate instruction generation PWM section 15' determines how much time is left for the UH element 31 to be on or off in synchronous rectification. Based on the determined time, the stator gate instruction generation PWM section 15' can control a period during which the UH element 31 is on to be shorter or longer than a last cycle.

Thus, efficiency in a synchronous rectification operation is raised to its highest possible level in consideration of real-time operating condition of a rotary motor.

Figure 9:
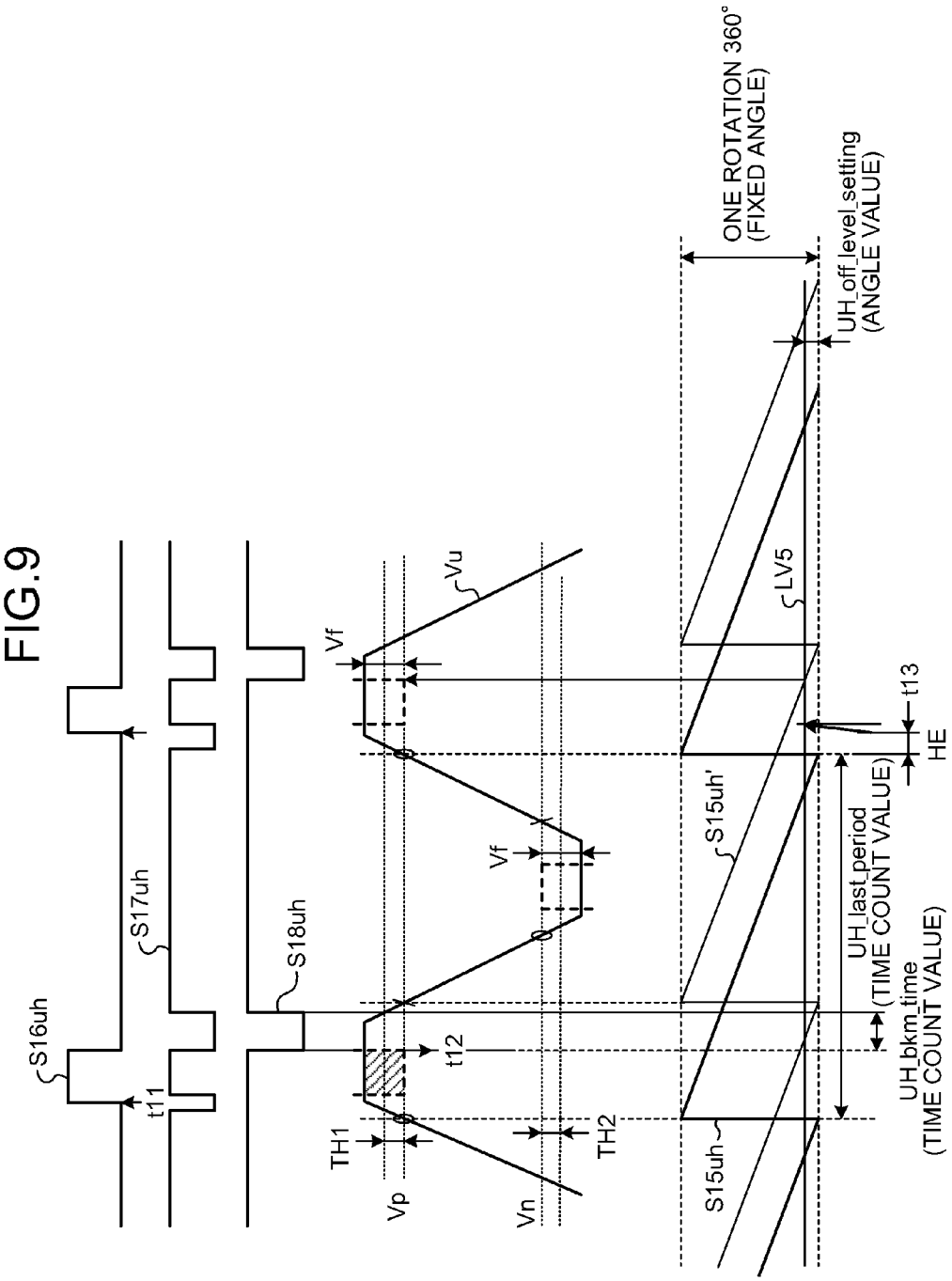
FIG. 9 is a timing chart showing a signal waveform of each part of the power converter shown in FIG. 8.

FIG. 9 is a timing chart showing a signal waveform of each part of the power converter shown in FIG. 8. With reference to FIG. 9, with attention focused only on the U-phase induction voltage Vu, a threshold TH1 to detect voltage change of the UH diode 32 by the forward voltage Vf with respect to the positive terminal voltage Vp is defined for the U-phase induction voltage Vu. The threshold TH1 may be about half the voltage Vf.

At this time, ON state of the UH element 31 is detected and the threshold TH1 is defined not on the basis of a ground potential but on the basis of a difference from the positive terminal voltage Vp. Further, a differential comparison amplifier is used for detection, thereby enhancing a detection accuracy.

Likewise, a threshold TH2 to detect voltage change of the UL diode 33 by the forward voltage Vf with respect to the negative terminal voltage Vn is defined for the U-phase induction voltage Vu. The threshold TH2 may be about half the voltage Vf.

At this time, ON state of the UL element 32 is detected and the threshold TH2 is defined not on the basis of a ground potential but on the basis of a difference from the negative terminal voltage Vn. Further, a differential comparison amplifier is used for detection, thereby enhancing a detection accuracy.

The stator gate ON state detector 16 outputs a UH element ON detection signal S17$uh$ as a result showing that gate ON state of the UH element 31 is detected to the stator gate instruction monitor 17.

Likewise, the stator gate ON state detector 16 outputs a UL element ON detection signal S17$ul$ as a result showing that gate ON state of the UL element 33 is detected, a VH element ON detection signal S17$vh$ as a result showing that gate ON state of the VH element 35 is detected, and a VL element ON detection signal S17$vl$ as a result showing that gate ON state of the VL element 37 is detected. The stator gate ON state detector 16 also outputs a WH element ON detection signal S17$wh$ as a result showing that gate ON state of the WH element 39 is detected, and a WL element ON detection signal S17$wl$ as a result showing that gate ON state of the WL element 311 is detected.

Assuming that a rise time t11 of the gate instruction signal S16$uh$ given from the stator gate instruction generator PWM section 15' is a starting point, the stator gate instruction monitor 17 detects a low period by using a fall time t12 of the UH element ON detection signal S17$uh$ in an event after the time t11. Then, the stator gate instruction monitor 17 generates a UH diode ON detection period signal S18$uh$ indicating a period after the UH element 31 is turned off, and outputs the UH diode ON detection period signal S18 to the stator gate instruction generator PWM section 15'.

Likewise, the stator gate instruction monitor 17 outputs a UL diode ON detection period signal S18$ul$ indicating a period after the UL element 33 is turned off, a VH diode ON detection period signal S18$vh$ indicating a period after the VH element 35 is turned off, and a VL diode ON detection period signal S18$vl$ indicating a period after the VL element 37 is turned off. The stator gate instruction monitor 17 also outputs a WH diode ON detection period signal S18$wh$ indicating a period after the WH element 39 is turned off, and a WL diode ON detection period signal S18$wl$ indicating a period after the WL element 311 is turned off.

The stator gate instruction generator PWM section 15' can measure a time T1 of a detection period of the UH diode ON detection period signal S18 by using a first counter for making counts at fixed time intervals H1 such as 1 usec.

The stator gate instruction generator PWM section 15' compares a current level of the UH-phase OFF triangular wave 15$uh$' with the level LV1. Then, by using a second counter for making counts at the fixed time intervals H1, the stator gate instruction generator PWM section 15' can measure a time T2 of a period during which the level LV1 is higher than the level of the UH-phase OFF triangular wave 15$uh$', and record the measured time T2.

The stator gate instruction generator PWM section 15' compares the times T1 and T2 to see whether the UH element 31 was turned off too early or too late. If the UH element 31 was turned off too early, the stator gate instruction generator PWM section 15' may raise the level LV2. If the UH element 31 is turned off too late, the stator gate instruction generator PWM section 15' can lower the level LV2.

Thus, the stator gate instruction generator PWM section 15' can generate the stator gate instruction signal S16 while the UH element 31 is always turned off correctly in compliance with variations in rotation of the rotary motor.

Fourth Embodiment

With reference to FIG. 8, the cycle checker 14 compares the diode ON synthesized signal S12 with the ON synchronized signal S13. The cycle checker 14 also compares the diode OFF synthesized signal S12' with the OFF synchronized signal S13'.

By way of example, the cycle checker 14 provides a fixed synchronization determining interval SK extending backward and forward of the time axis of the ON synchronized signal S13. The synchronization determining interval SK is provided for each of the UH, UL, VH, VL, WH, and WL phases.

The synchronization determining intervals SK of all the phases including the UH, UL, VH, VL, WH, and WL phases are connected together. Next, a check is made to see whether the UH-phase Don detection signal S12*uh*, the UL-phase Don detection signal S12*ul*, the VH-phase Don detection signal S12*vh*, the VL-phase Don detection signal S12*vl*, the WH-phase Don detection signal S12*wh*, and the WL-phase Don detection signal S12*wl* fall within their respective synchronization determining intervals SK. As a result, it is determined whether a cycle of determining times when diodes are turned on is complied with. It is also determined whether an order of determining times is complied with. If it is determined that the cycle of determining times when diodes are turned on is complied with, and that the order of determining times is complied with, the cycle checker 14 outputs the synchronization determining signal S14 to the stator gate instruction generator PWM section 15'.

In the case of rotation in a forward rotation, for example, phases are detected in the following order: UH, WL, VH, UL, WH, VL, and UH phases. Accordingly, by making a check to see whether times when diodes are turned off in this order, compliance with the order of determining times when diodes are turned on is checked. If the order of phase detection does not change, or there is no loss in the order over a predetermined number of cycles (such as one or eight cycles), the cycle checker 14 determines that synchronization determination ends in success, and outputs the synchronization determining signal S14.

By following the same process as that for the process relating to determination of times when diodes are turned on, the cycle checker 14 can check to see whether a cycle of determining times when diodes are turned off is complied with, and whether an order of determining times is complied with.

Thus, the cycle checker 14 can check to see whether times when diodes of all the phases are turned on and off are determined at fixed intervals. The cycle checker 14 can also check to see whether times when diodes are turned on and off are determined in a given order of phases. This allows a more reliable check to see that a phase difference is at a fixed level (120 degrees) between the U, V, and W phases, and that a phase difference between the higher side and the lower side is at a fixed level (180 degrees).

Fifth Embodiment

With reference to FIG. 4, with attention focused only on the UH phase, a margin PMA is set at the level LV4. The margin PMA extends from a point of zero degrees in each cycle of the ON synchronized signal S13 to a time when the UH element 31 is turned on in terms of electrical angle of a rotary motor.

The stator gate instruction generator PWM section 15' compares the level of the UH-phase ON triangular wave S15*uh* with the level LV4. Then, the stator gate instruction generator PWM section 15' can turn the UH element 31 on at the fall time t1 of the UH-phase Don detection signal S12*uh*, or a time t2 when the level of the UH-phase ON triangular wave S15*uh* reaches the level LV4 that is later than the other.

The margin TMA is set at the level LV1. The margin TMA extends from a point of 360 degrees in each cycle of the OFF synchronized signal S13' to a time when the UH element 31 is turned off in terms of electrical angle of the rotary motor. A period during which the UH element is on is set at the level LV3.

The stator gate instruction generator PWM section 15' compares the level of the UH-phase OFF triangular wave S15*uh*' with the level LV1, and compares the level of the UH-phase ON triangular wave S15*uh* with the level LV3. Then, the stator gate instruction generator PWM section 15' can turn the UH element 31 off at a time t3 when the level of the UH-phase OFF triangular wave S15*uh*' reaches the level LV1, or at a time t4 when the UH-phase ON triangular wave S15*uh* reaches the level LV3 that is earlier than the other.

Sixth Embodiment

With reference to FIG. 9, with attention focused only on the UH phase, it is assumed that the level LV3 is set such that a period during which the UH element 31 is on is longer than a period during which the UH diode 32 is on. In this case, the stator gate instruction generator PWM section 15' shown in FIG. 8 measures a time UH_bkm_time of a UH diode ON detection period signal S18*uh* to see whether the UH element 31 is turned off at a too early time or at a too late time with respect to the time t3 when the level of the UH-phase OFF triangular wave S15*uh*' reaches the level LV1.

Then, the stator gate instruction generator PWM section 15' compares the level LV2 with the UH-phase ON triangular wave S15*uh* while raising or lowering the level LV2 within a predetermined degree. This allows a period during which the UH element 31 is on to be maximized with respect to a period during which the UH diode 32 is on.

Seventh Embodiment

With reference to FIG. 9, with attention focused only on the UH phase, the stator gate instruction generator PWM section 15' shown in FIG. 8 measures lengths of time of one ON cycle and one OFF cycle of the UH diode 32 by using a counter. Next, the stator gate instruction generator PWM section 15' compares measured lengths of time at each measurement to see the number of counts a unit electrical angle corresponds to in terms of time. Then, the stator gate instruction generator PWM section 15' converts times when the UH element 31 is turned on and off to electrical angles, and outputs a level signal.

The stator gate instruction generator PWM section 15' thereafter compares the level signal with the UH-phase ON triangular wave S15*uh* and the UH-phase OFF triangular wave S15*uh*' while taking the levels LV1 and LV4 defined on the basis of angle into consideration. Thus, while restrictions on setting a period during which the UH element 31 is on based on electrical angle and those based on time are simultaneously taken into consideration, the stator gate instruction generator PWM section 15' can define a period during which the UH element 31 is on under stricter restrictions.

As an example, when a level signal is generated by converting a count value of time to an electrical angle, "phase_last_off_level" is obtained from the following formula:

$$360/(\text{phase\_last\_period}) \times \text{phase\_bkm\_time}$$

In this formula, "phase_last_period" represents a time count value from a time when a diode is turned on immediately before to a time when the diode is turned on this time, and "phase_bkm_time" represents a time count value from a time of switching off immediately before to a time when a diode is turned off.

If "phase_last_off_level" is the same as or greater than "off_level_target angle," "phase_off_level_setting" may be decreased. If "phase_last_off_level" is smaller than "off_level_target angle," "phase_off_level_setting" may be increased. Here, "off_level_target angle" may be common to all the phases.

As an example, With reference to FIG. 9, with attention focused on the UH phase, a time "UH_bkm_time" of the UH diode ON detection period signal S18*uh* is measured to obtain "UH_last_off_level." Then, based on a result of comparison between "UH_last_off_level" and "off_level_target_angle," "UH_level_setting" is increased or decreased, thereby defining a UH-phase OFF level LV5 (time t13). This process may be performed within a calculation time HE. Then, based on a newly defined "UH_level_setting," a time when the UH element 31 shown in FIG. 2 is turned off is controlled.

As described above, a period during which the UH element 31 is on can be defined in combination with restrictions based on electrical angle and those based on time, and the UH element 31 can be controlled to be turned on and off at a time of a greater electrical angle. This allows a higher degree of safety in synchronous rectification in situations including low-speed rotation in which a time of a unit electrical angle is long and high-speed rotation in which a time of a unit electrical angle is quite short.

Eighth Embodiment

Figure 10:
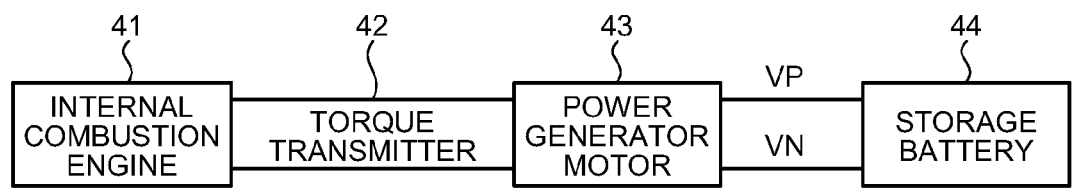
FIG. 10 is a block diagram showing the schematic configuration of a vehicle system of an eighth embodiment to which the power converter of the invention is applied.

FIG. 10 is a block diagram showing the schematic configuration of a vehicle system of an eighth embodiment to which the power converter of the invention is applied. With reference to FIG. 10, a power generator motor 43 functioning as a vehicle rotary motor generates electricity after driven by an internal combustion engine 41 through a torque transmitter 42 such as a belt, thereby generating AC energy.

AC energy generated by the power generator motor 43 is converted to DC energy while the internal combustion engine 41 is in operation. The converted DC energy is stored in the storage battery 44. The power converter shown in FIG. 1, or the power converter shown in FIG. 8 may be used as the power generator motor 43 of FIG. 8.

The power converter described in the foregoing embodiments performs power conversion for three phases including the U, V, and W phases. However, the invention is not limited to the power converter for performing power conversion for three phases including the U, V, and W phases. As long as phases are evenly spaced in terms of electrical angle, the invention may also be applied to a power converter for performing power conversion for N (N is an integer no less than two) phases.

The invention realizes synchronous rectification without requiring attachment of a sensor for determining a rotational position to the shaft of a rotary motor. The invention also reduces a burden to be placed on a check to see whether the cycle of an induction voltage of each phase is correct, and whether phases are detected in correct order.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power converter, comprising:
   2N (N is an integer no less than two) switching elements, of N phases, provided in each of higher and lower arms;
   2N freewheeling diodes connected in parallel with corresponding ones of the 2N switching elements;
   a diode conducting state detector for determining times at which the 2N freewheeling diodes are turned on and off;
   an ON PLL circuit for generating an ON synchronized signal formed as a result of synchronization control based on the times determined by the diode conducting state detector when the 2N freewheeling diodes are turned on;
   an OFF PLL circuit for generating an OFF synchronized signal formed as a result of synchronization control based on the times determined by the diode conducting state detector when the 2N freewheeling diodes are turned off;
   a gate instruction generator PWM section for generating a gate instruction signal on the basis of the ON synchronized signal and the OFF synchronized signal, the gate instruction signal controlling switching of the switching elements; and
   a cycle checker for checking to see whether the cycle of an induction voltage of each phase is correct and whether all phases are detected in correct order, the checks being made by comparing results of determinations of times when the 2N freewheeling diodes are turned on and off with the ON synchronized signal and the OFF synchronized signal, wherein
   the gate instruction generator PWM section generates the gate instruction signals on the basis of results of the checks made by the cycle checker.

2. The power converter according to claim 1, wherein the ON PLL circuit and the OFF PLL circuit operate independently of each other.

3. The power converter according to claim 1, comprising:
   a Don signal synthesizer for synthesizing times when the 2N freewheeling diodes are turned on into a single temporal sequence, and outputting a resultant synthesized signal to the ON PLL circuit; and
   a Doff signal synthesizer for synthesizing times when the 2N freewheeling diodes are turned off into a single temporal sequence, and outputting a resultant synthesized signal to the OFF PLL circuit.

4. The power converter according to claim 1, wherein the gate instruction generator PWM section includes:
   2N ON triangular wave generators for generating ON triangular waves of N phases in each of the higher and lower arms on the basis of the ON synchronized signal;
   2N OFF triangular wave generators for generating OFF triangular waves of the N phases in each of the higher and lower arms on the basis of the OFF synchronized signal; and
   a gate instruction signal generator for generating gate instruction signals of the N phases in each of the higher and lower arms by comparing an ON triangular wave and an OFF triangular wave of each respective phase.

5. The power converter according to claim 1, wherein the ON triangular wave generators each generate an ON triangular wave of a corresponding phase in each of the higher and lower arms on the basis of a count operation by a counter, the count operation being such that the ON triangular wave generator is activated at an ON time of a self phase in each of the higher and lower arms, while being reset at the next successive ON time of the self phase in each of the higher and lower arms, and wherein the OFF triangular wave generators each generate an OFF triangular wave of a corresponding phase in each of the higher and lower arms on the basis of a count operation by a counter, the count operation being such that the OFF triangular wave generator is activated at an OFF time of a self phase in each of the higher and lower arms, while being reset at the next successive OFF time of the self phase in each of the higher and lower arms.

6. The power converter according to claim 1, wherein the ON triangular wave generators each generate an ON triangular wave on the basis of an operation of adding components of the ON synchronized signal of all phases during a period between an ON time of a self phase in each of the higher and lower arms and the next successive ON time of the self phase in each of the higher and lower arms, and wherein
the OFF triangular wave generators each generate an OFF triangular wave on the basis of an operation of adding components of the OFF synchronized signal of all phases during a period between an OFF time of a self phase in each of the higher and lower arms and the next successive OFF time of the self phase in each of the higher and lower arms.

7. The power converter according to claim 6, wherein the gate instruction signal generator defines a time when each switching element starts to be turned on by comparing a first level with the ON triangular wave, wherein the first level is defined on the basis of a proportion of a period during which the switching element is on to one cycle of the electrical angle.

8. The power converter according to claim 7, wherein the gate instruction signal generator defines a period during which each switching element is turned on by comparing a second level with the ON triangular wave, wherein the second level is defined on the basis of a proportion of converted electrical angle to the cycle.

9. The power converter according to claim 8, wherein the gate instruction signal generator defines a period during which each switching element is turned on by comparing the first and second levels with the ON triangular wave.

10. The power converter according to claim 6, wherein the gate instruction signal generator defines a time when each switching element starts to be turned off by comparing a first level with the OFF triangular wave, wherein the first level is defined on the basis of a proportion of a period during which the switching element is on to one cycle of the electrical angle.

11. The power converter according to claim 10, wherein the gate instruction signal generator defines a time when each switching element starts to be turned off by converting a period during which each switching element is on to an electrical angle on the basis of a count value of one cycle of the electrical angle, and by comparing a second level with the OFF triangular wave, wherein the second level is defined on the basis of a proportion of converted electrical angle to the cycle.

12. The power converter according to claim 11, wherein the gate instruction signal generator defines a time when each switching element starts to be turned off by comparing the first and second levels with the OFF triangular wave.

13. The power converter according to claim 1, wherein the cycle checker determines the presence or absence of synchronization by checking to see for each phase in each of the higher and lower arms how far the results of determinations of times when the 2N freewheeling diodes are turned on are apart from the ON synchronized signal in terms of electrical angle of an armature of a rotary motor, and by checking to see for each phase in each of the higher and lower arms how far the results of determinations of times when the 2N freewheeling diodes are turned off are apart from the OFF synchronized signal in terms of electrical angle of the armature of the rotary motor.

14. The power converter according to claim 1, wherein: the cycle checker checks to see for each phase in each of the higher and lower arms how far the results of determinations of times when the 2N freewheeling diodes are turned on are apart from the ON synchronized signal in terms of electrical angle of an armature of a rotary motor; the cycle checker defines a condition for determining ON-side synchronization of the freewheeling diodes, the condition requiring that an order of detection of ON-side current phases of the freewheeling diodes coincides with an order of detection of ON-side past phases thereof, while requiring that phases are detected successively a predetermined number of times; the cycle checker checks to see for each phase in each of the higher and lower arms how far the results of determinations of times when the 2N freewheeling diodes are turned off are apart from the OFF synchronized signal in terms of electrical angle of the armature of the rotary motor; and the cycle checker defines a condition for determining OFF-side synchronization of the freewheeling diodes, the condition requiring that an order of detection of OFF-side current phases of the freewheeling diodes coincides with an order of detection of OFF-side past phases thereof, while requiring that phases are detected successively a predetermined number of times.

15. A power converter, comprising:
2N (N is an integer no less than two) switching elements, of N phases, provided in each of higher and lower arms;
2N freewheeling diodes connected in parallel with corresponding ones of the 2N switching elements;
a diode conducting state detector for determining times at which the 2N freewheeling diodes are turned on and off;
an ON PLL circuit for generating an ON synchronized signal formed as a result of synchronization control based on the times determined by the diode conducting state detector when the 2N freewheeling diodes are turned on;
an OFF PLL circuit for generating an OFF synchronized signal formed as a result of synchronization control based on the times determined by the diode conducting state detector when the 2N freewheeling diodes are turned off;
a gate instruction generator PWM section for generating a gate instruction signal on the basis of the ON synchronized signal and the OFF synchronized signal, the gate instruction signal controlling switching of the switching elements;
a gate ON state detector for determining times when a switching element of each phase is turned on and off in each of the higher and lower arms; and
a gate instruction monitor for monitoring a synchronous rectification operation by comparing a time when the switching element is turned on with the gate instruction signal in each phase of each of the higher and lower arms, and wherein
the gate instruction generator PWM section generates the gate instruction signal on the basis of a result of monitoring by the gate instruction monitor.

16. The power converter according to claim 15, wherein the gate ON state detector determines the ON/OFF state of the switching element in a period during which the freewheeling diode is on by comparing an induction voltage of each phase with a DC load voltage and a ground voltage while a motor generates electricity, and wherein
the gate instruction monitor checks to see whether the switching element is turned on in the period during which the freewheeling diode is on for each phase in each of the higher and lower arms, and whether the freewheeling diode is on when the switching element is turned off for each phase in each of the higher and lower arms, the checks being made by comparing the gate instruction signal with the ON/OFF state of the switching element.

17. The power converter according to claim 16, wherein the gate instruction monitor detects the period during which the freewheeling diode is on after turning off of the switching element is detected for each phase in the higher and lower arms, the detection of the period being made by comparing the gate instruction signal with the ON/OFF state of the switching element, and wherein the gate instruction generator PWM section controls a period during which the switching element is on based on the period during which the freewheeling diode is on detected by the gate instruction monitor.

\* \* \* \* \*